(12) United States Patent
Mizuno

(10) Patent No.: US 10,616,202 B2
(45) Date of Patent: Apr. 7, 2020

(54) INFORMATION PROCESSING APPARATUS, INFORMATION PROCESSING METHOD, AND NON-TRANSITORY COMPUTER-READABLE STORAGE MEDIUM

(71) Applicant: CANON KABUSHIKI KAISHA, Tokyo (JP)

(72) Inventor: Takafumi Mizuno, Higashimurayama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/925,197

(22) Filed: Mar. 19, 2018

(65) Prior Publication Data
US 2018/0212944 A1    Jul. 26, 2018

Related U.S. Application Data

(63) Continuation of application No. 14/448,669, filed on Jul. 31, 2014, now Pat. No. 9,935,929.

(30) Foreign Application Priority Data

Oct. 2, 2013    (JP) ................................. 2013-207420

(51) Int. Cl.
*H04L 29/06* (2006.01)
*H04L 29/08* (2006.01)

(52) U.S. Cl.
CPC ............ *H04L 63/08* (2013.01); *H04L 63/102* (2013.01); *H04L 67/306* (2013.01)

(58) Field of Classification Search
CPC ..... H04L 63/08; H04L 63/102; H04L 63/103; H04L 67/306
See application file for complete search history.

(56) References Cited

U.S. PATENT DOCUMENTS

| | | | |
|---|---|---|---|
| 8,593,658 B2 * | 11/2013 | Sato ...................... | G06F 3/1204 358/1.14 |
| 8,749,809 B2 * | 6/2014 | Selvaraj ................ | G06F 3/1205 358/1.13 |
| 2005/0226468 A1 * | 10/2005 | Deshpande ............. | H04M 1/66 382/115 |

(Continued)

FOREIGN PATENT DOCUMENTS

| | | |
|---|---|---|
| CN | 103999048 A | 8/2014 |
| JP | 2013-176915 A | 9/2013 |

*Primary Examiner* — Ghodrat Jamshidi
(74) *Attorney, Agent, or Firm* — Canon U.S.A., Inc., IP Division

(57) ABSTRACT

Before one of a first user and a second user has been authenticated, an information processing apparatus acquires first setting information corresponding to the first user and first setting information corresponding to the second user from a first storage unit and store the first setting information corresponding to the first user and the first setting information corresponding to the second user in a second storage unit. Then, after one of the first user and the second user has been authenticated, the information processing apparatus acquires the first setting information corresponding to the authenticated user from the second storage unit and furthermore acquires the second setting information corresponding to the authenticated user from the first storage unit.

19 Claims, 17 Drawing Sheets

```
-DISPLAY LANGUAGE
-INITIAL SCREEN
```

(56) References Cited

U.S. PATENT DOCUMENTS

| | | | |
|---|---|---|---|
| 2006/0198653 A1* | 9/2006 | Plewnia | G03G 21/02 399/79 |
| 2007/0092282 A1* | 4/2007 | Takenoshita | G03G 15/5016 399/81 |
| 2007/0234400 A1* | 10/2007 | Yanagi | G06F 21/608 726/1 |
| 2009/0262387 A1* | 10/2009 | Sakakibara | H04N 1/00222 358/1.15 |
| 2010/0030346 A1* | 2/2010 | Watanabe | G06F 21/629 700/7 |
| 2011/0075218 A1* | 3/2011 | Hada | G11B 20/1816 358/1.16 |
| 2011/0181900 A1* | 7/2011 | Suese | H04N 1/00413 358/1.13 |
| 2011/0214167 A1* | 9/2011 | Oka | G06F 21/608 726/7 |
| 2011/0244441 A1* | 10/2011 | Okabayashi | H04N 1/00408 434/365 |
| 2011/0249290 A1* | 10/2011 | Hayber | G06F 3/121 358/1.15 |
| 2012/0057180 A1* | 3/2012 | Lee | G06F 21/608 358/1.13 |
| 2013/0097416 A1* | 4/2013 | Barra | G06F 9/4451 713/100 |
| 2013/0135675 A1* | 5/2013 | Hashimoto | H04N 1/0097 358/1.15 |
| 2013/0246639 A1* | 9/2013 | Nedbal | H04L 63/101 709/228 |
| 2013/0272610 A1* | 10/2013 | Ogishi | G06K 9/6267 382/175 |
| 2014/0211245 A1* | 7/2014 | Maruyama | G06F 3/1205 358/1.15 |
| 2015/0193465 A1* | 7/2015 | Schoeffler | G06F 3/04842 707/827 |

* cited by examiner

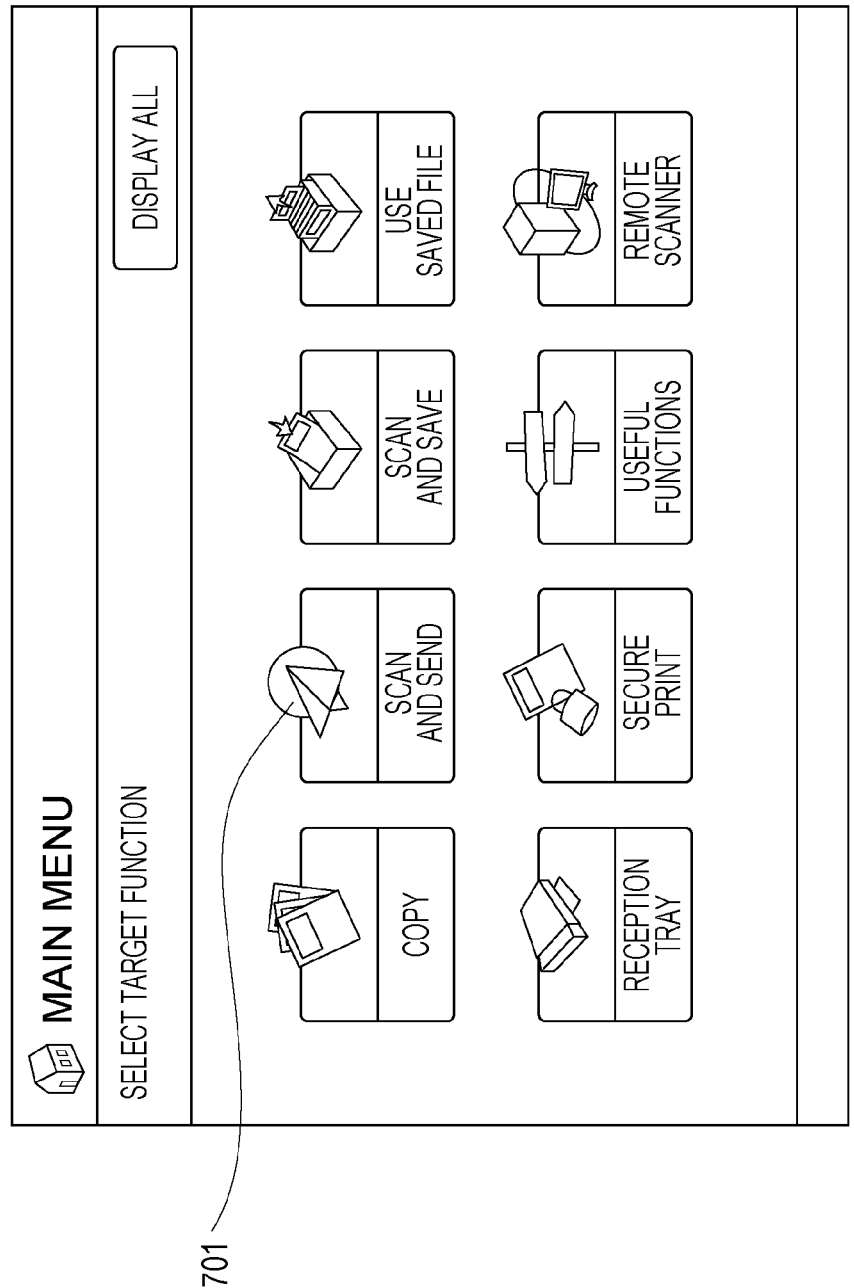

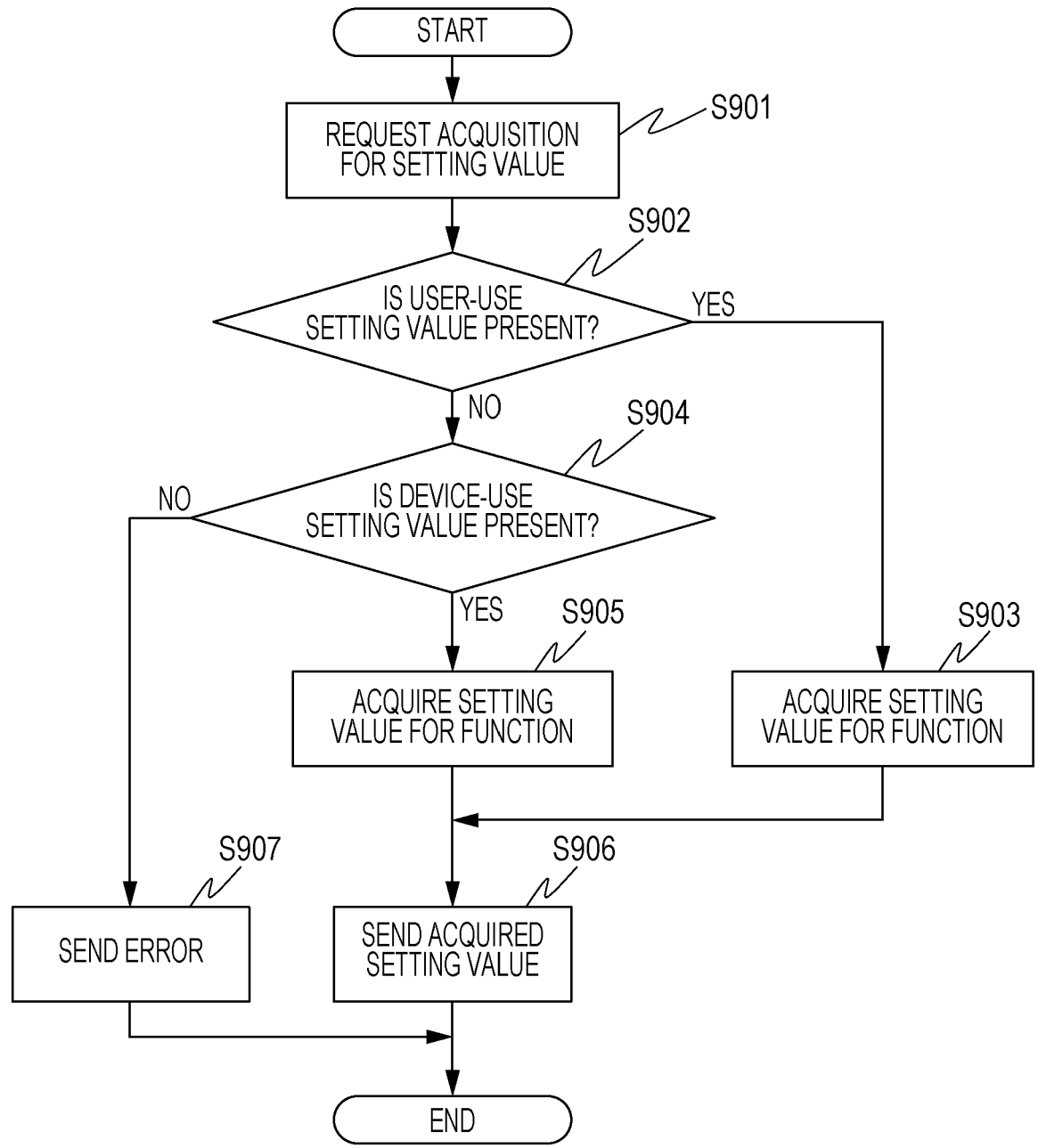

INFORMATION PROCESSING APPARATUS, INFORMATION PROCESSING METHOD, AND NON-TRANSITORY COMPUTER-READABLE STORAGE MEDIUM

CROSS-REFERENCE TO RELATED APPLICATIONS

This application is a Continuation, and claims the benefit, of U.S. patent application Ser. No. 14/448,669 filed Jul. 31, 2014 (now U.S. Pat. No. 9,935,929 B2), which claims priority from Japanese Patent Application No. 2013-207420 filed Oct. 2, 2013. Each of U.S. patent application Ser. No. 14/448,669 and Japanese Patent Application No. 2013-207420 is hereby incorporated by reference herein in its entirety.

BACKGROUND OF THE INVENTION

Field of the Invention

The present invention relates to an information processing apparatus configured to operate in accordance with setting information and an information processing method for acquiring setting information from a storage device, the setting information having been set for the information processing apparatus.

Description of the Related Art

Only an authenticated user may use an information processing apparatus in which an authentication mechanism is built in. Furthermore, there is an information processing apparatus that predicts a time frame in which each user is expected to log in and moves user information such as ID, a password, gender, age, birthplace, and the like from a working memory to a cache memory when the current time reaches the time frame (Japanese Patent Laid-Open No. 2009-93512).

In a method in which a time frame in which a user is expected to log in is predicted and user information of the user is moved to a high-speed memory, it is necessary to predict a time frame and an additional system is necessary for predicting a time frame.

Since, of course, a time frame may be predicted wrong, when a user A tries to log in, there may possibly be a case where user information of a user B has been moved to a high-speed memory but user information of the user A has not been moved to the high-speed memory.

Furthermore, in Japanese Patent Laid-Open No. 2009-93512, for users for whom it is unknown whether or not a login is to be performed, the user information of all the users has been moved to a high-speed memory. If it is predicted that a plurality of users are expected to log in in the same time frame, all the user information corresponding to the plurality of users needs to be moved to a high-speed memory and the capacity of the high-speed memory may not be sufficient.

SUMMARY OF THE INVENTION

An information processing apparatus according to the present invention is an information processing apparatus configured to operate in accordance with setting information. The information processing apparatus includes a first storage unit, a second storage unit, an authentication unit, and a storage control unit. The first storage unit is configured to store first and second setting information corresponding to a first user and first and second setting information corresponding to a second user. The second storage unit is different from the first storage unit. The authentication unit is configured to authenticate one of the first user and the second user. The storage control unit is configured to acquire the first setting information corresponding to the first user and the first setting information corresponding to the second user from the first storage unit and store the first setting information corresponding to the first user and the first setting information corresponding to the second user in the second storage unit before one of the first user and the second user has been authenticated by the authenticated unit; acquire, after one of the first user and the second user has been authenticated by the authentication unit, the first setting information corresponding to the authenticated user from the second storage unit; and acquire, after one of the first user and the second user has been authenticated by the authentication unit, the second setting information corresponding to the authenticated user from the first storage unit.

In addition, an information processing method according to the present invention is an information processing method for acquiring first and second setting information from a first storage device, in which the first and second setting information being stored, the first and second setting information being set for an information processing apparatus. The information processing method includes authenticating one of a first user and a second user; acquiring first setting information corresponding to the first user and first setting information corresponding to the second user from the first storage unit before one of the first user and the second user has been authenticated, storing, in the second storage device, the first setting information acquired in the acquiring of first setting information of the first and second users before one of the first user and the second user has been authenticated, the second storage device being different from the first storage device; after one of the first user and the second user has been authenticated, acquiring the first setting information corresponding to the authenticated user from the second storage device; and after one of the first user and the second user has been authenticated, acquiring the second setting information corresponding to the authenticated user from the first storage device.

In addition, a non-transitory computer-readable storage medium according to the present invention is a non-transitory computer-readable storage medium storing a program for acquiring first and second setting information from a first storage device, in which the first and second setting information being stored, the first and second setting information being set for an information processing apparatus. The program causes a computer to execute: authenticating one of a first user and a second user; acquiring first setting information corresponding to the first user and first setting information corresponding to the second user from the first storage unit before one of the first user and the second user has been authenticated; storing, in the second storage device, the first setting information acquired in the acquiring of first setting information of the first and second users before one of the first user and the second user has been authenticated, the second storage device being different from the first storage device; after one of the first user and the second user has been authenticated, acquiring the first setting information corresponding to the authenticated user from the second storage device; and after one of the first user and the second user has been authenticated, acquiring the second setting information corresponding to the authenticated user from the first storage device.

Further features of the present invention will become apparent from the following description of exemplary embodiments with reference to the attached drawings.

BRIEF DESCRIPTION OF THE DRAWINGS

FIGS. 7A to 7C are diagrams illustrating an example of a screen to be displayed after login.

FIG. 9 is a flowchart illustrating an acquisition process to be performed in the information processing apparatus.

FIG. 10 is a diagram illustrating an example of a list of setting values necessary for login.

DESCRIPTION OF THE EMBODIMENTS

First Embodiment

Embodiments will be described with reference to drawings.

Figure 1:
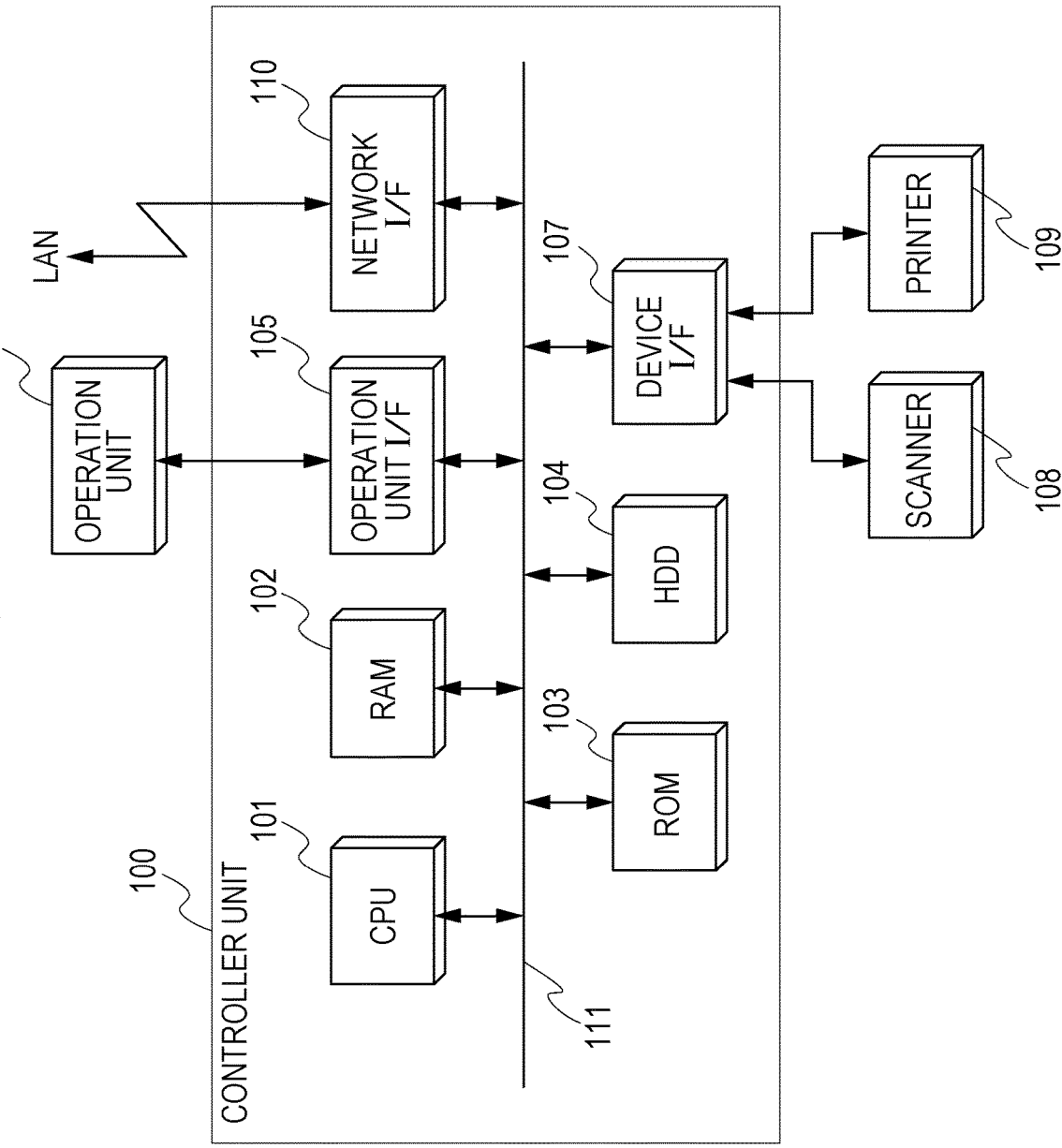
FIG. 1 is a diagram illustrating a hardware configuration of an information processing apparatus.

FIG. 1 is a diagram illustrating a hardware configuration of an information processing apparatus. In the present embodiment, a multi-function device will be described as an example of an information processing apparatus. FIG. 1 is an exemplary diagram for describing the present embodiment and other configuration requirements may be included in the information processing apparatus.

The information processing apparatus includes a controller unit 100, an operation unit 106, a scanner 108, and a printer 109. In addition, the controller unit 100 includes a central processing unit (CPU) 101, a random-access memory (RAM) 102, a read-only memory (ROM) 103, a hard disk drive (HDD) 104, an operation unit I/F 105, a device I/F 107, a network I/F 110, and a bus 111.

The CPU 101 executes various information processes in accordance with a control program, and controls the operation unit 106, the scanner 108, and the printer 109. In addition, the CPU 101 may communicate with an external device via the network I/F 110.

The RAM 102 is a volatile storage device, and functions as a working memory that the CPU 101 uses to execute various information processes. A nonvolatile storage device that may be accessed at a high speed may also be used as a substitute for the RAM 102. The ROM 103 is a nonvolatile storage device and stores various control programs and setting values. The HDD 104 is also a nonvolatile storage device and stores control programs and setting values. Programs stored in the ROM 103 or the HDD 104 are transferred to the RAM 102 and executed by the CPU 101. In addition, the information processing apparatus operates in accordance with setting values transferred from the ROM 103 or the HDD 104 to the RAM 102.

The operation unit I/F 105 monitors an input from the operation unit 106 and sends input information to the CPU 101. In addition, the operation unit I/F 105 controls the operation unit 106 in accordance with instructions from the CPU 101 such that information is displayed. The operation unit 106 is an input device such as a touch panel and a button, and also is a display device such as a light-emitting diode (LED) display and a liquid crystal display (LCD). The operation unit 106 may also be a touch panel display that functions as both an input device and a display device.

The device I/F 107 sends a command received from the CPU 101 to the scanner 108 or the printer 109. In addition, the device I/F 107 receives image data from the scanner 108 and sends the image data to the printer 109. The scanner 108 reads an image on a sheet and generates image data. The printer 109 prints an image based on the image data, on a sheet.

The information processing apparatus provides a copy function using the scanner 108 and the printer 109. The CPU 101 causes the scanner 108 to read an image, executes image processing on image data generated by the scanner 108, and causes the printer 109 to print an image based on the image data on which image processing has been executed. Note that, image processing may also be executed by an image processing hardware device other than the CPU 101. In image processing, image data may be processed such that images read individually from two documents are printed on a single sheet (2 in 1). In addition, the information processing apparatus provides a send function through which image data generated by the scanner 108 is sent via the network I/F 110 and a FAX function through which image data generated by the scanner 108 is sent via a telephone line, which is not illustrated. In the case where the information processing apparatus does not provide the copy function, the send function, and the FAX function, the information processing apparatus does not have to include the scanner 108.

The network I/F 110 controls network communication performed via a local-area network (LAN) in accordance with instructions from the CPU 101. The LAN may be wireless or wired or may use public telephone lines. In addition, the information processing apparatus may have a USB I/F through which communication is performed with an external device via a USB cable.

The CPU 101, the RAM 102, the ROM 103, the HDD 104, the operation unit I/F 105, the device I/F 107, and the network I/F 110 are connected to the bus 111.

A program to be executed by the CPU 101 is stored in the ROM 103 or the HDD 104 and is loaded in the RAM 102 when the information processing apparatus is started up or when a certain function is provided. The CPU 101 executes a program loaded in the RAM 102.

The CPU 101 causes the operation unit 106 to display information and acquires information input by a user using the operation unit 106 via the operation unit I/F 105.

The CPU 101 performs authentication processing for login. In authentication processing, it is determined whether or not a user is allowed to use the information processing apparatus, and start of a user's login, completion of the user's login, and the user's logout are managed. More specifically, the CPU 101 commands the operation unit 106 to display an authentication screen, acquires authentication information input by a user using the operation unit 106, and performs authentication on the basis of the authentication information. In the case where authentication has been successful, the CPU 101 acquires a setting value associated with the user, and controls a screen to be displayed after login on the basis of the setting value.

The CPU 101 writes a setting value into the RAM 102 or the HDD 104, or reads a setting value from the RAM 102 or the HDD 104. When the information processing apparatus is started up, for all users, the CPU 101 reads setting values associated with individual users and necessary for login, and writes the setting values into the RAM 102. In the case where a user's login is started, the CPU 101 acquires a setting value associated with the user from the RAM 102, and controls a screen to be displayed after login on the basis of the acquired setting value. In the present embodiment, suppose that an access speed of the RAM 102 is faster than an access speed of the HDD 104. Then, the screen to be displayed after login is displayed sooner in the case where a setting value is acquired from the RAM 102 than in the case where a setting value is acquired from the HDD 104. When the user's login is completed, the CPU 101 reads a setting value associated with the user and necessary after login from the HDD 104, and writes the setting value into the RAM 102. As a result, when a setting value is necessary after login, the setting value may be accessed at a higher speed.

Figure 2:
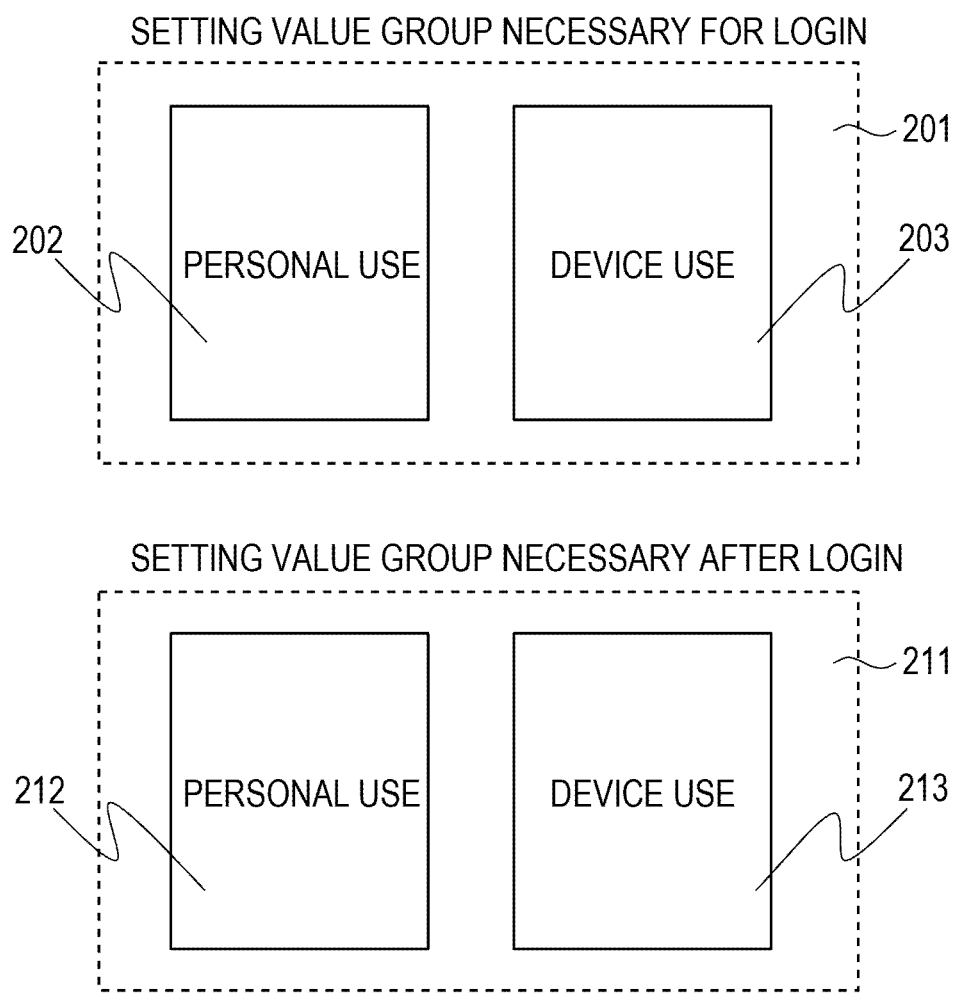
FIG. 2 is a diagram illustrating types of setting values stored in a HDD.

FIG. 2 is a diagram illustrating types of setting values stored in the HDD 104. In the HDD 104, a setting value group 201 necessary for login and a setting value group 211 necessary after login are separately stored. Setting values necessary for login are setting information necessary from start of the login to completion of the login. Setting values necessary after login are setting information necessary for functions to be executed after login.

The setting value group 201 necessary for login is further classified into personal-use setting values necessary for login and device-use setting values. The personal-use setting values necessary for login are stored in a storage area 202, and the device-use setting values necessary for login are stored in a storage area 203.

The setting value group 211 necessary after login is further classified into personal-use setting values necessary after login and device-use setting values. Personal-use setting values necessary after login are stored in a storage area 212, and device-use setting values necessary after login are stored in a storage area 213.

In the case where many users use the information processing apparatus and the number of setting values necessary for all the functions provided by the information processing apparatus is significantly large, it is difficult to store all the setting values in a storage device that enables high-speed access but has a relatively small storage capacity (for example, the RAM 102). In addition, setting values may be updated and it is necessary to store updated setting values for a certain period of time, for example, even after the information processing apparatus is switched off. Thus, it is not preferable that all the setting values be stored only in a volatile storage device (for example, the RAM 102). Consequently, in the present embodiment, all the setting values are stored in the HDD 104 and transferred from the HDD 104 to the RAM 102 as needed.

Personal-use setting values stored in the storage areas 202 and 212 are individually associated with a plurality of users. Device-use setting values are default setting values prepared for a user with whom no personal-use setting values are associated. For example, in the case where a guest user uses the information processing apparatus without being authenticated, device-use setting values are used.

As illustrated in FIG. 2, the number of setting values to be loaded in the RAM 102 before performing a login may be reduced by performing classification into the setting values necessary for login and the setting values necessary after login. As a result, setting values necessary for login and for all the users may be loaded in the RAM 102. Since setting values necessary for login and for a plurality of users have been loaded in the RAM 102, when any of the plurality of the users performs a login, a login process is performed at a high speed.

Figure 3A:
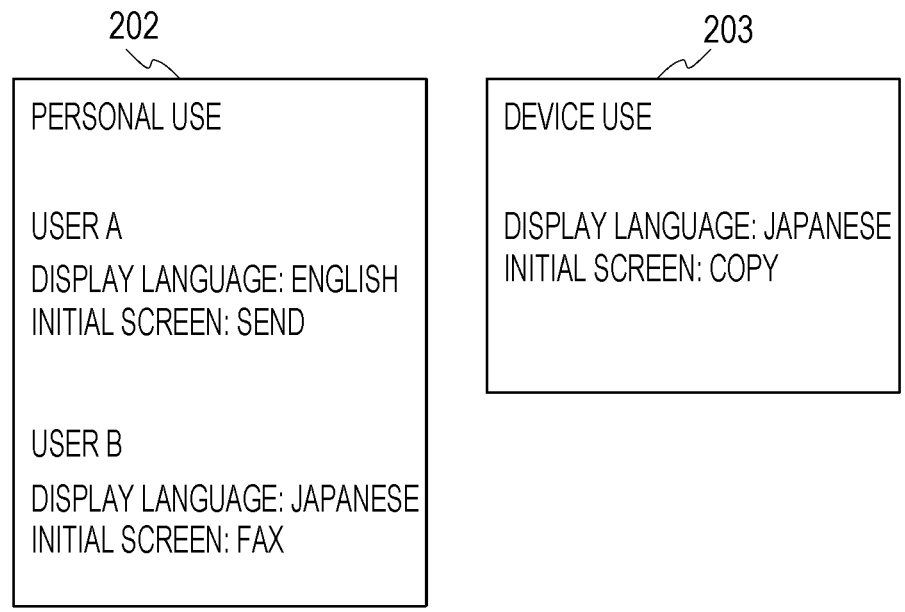
FIGS. 3A and 3B are diagrams illustrating examples of setting values necessary for login.
Figure 3B:
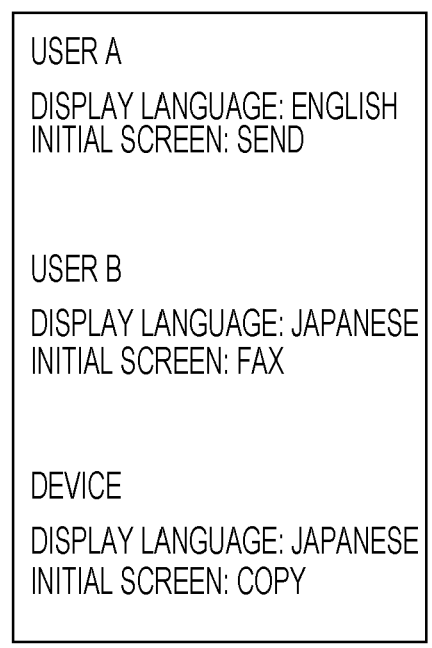

FIG. 3A is a diagram illustrating an example of the setting value group 201 necessary for login. In the storage area 202, setting values for a user A and setting values for a user B are stored. In the storage area 203, device-use setting values are stored. In FIGS. 3A and 3B, user names such as "user A" and "user B" are described as identification information for identifying a user to facilitate understanding. However, a user identifier that uniquely identifies a user such as a UUID may also be stored as identification information in the storage area 202. In the following embodiments, suppose that a user identifier is associated with a setting value and stored in the RAM 102 or the HDD 104.

A display language is a language used on a screen displayed on the operation unit 106. If a setting value for the display language is "English", an English screen is displayed on the operation unit 106. If a setting value for the display language is "Japanese", a Japanese screen is displayed on the operation unit 106.

An initial screen is a screen to be first displayed on the operation unit 106 after a user's login. If a setting value for the initial screen is "send", a screen for the send function is displayed on the operation unit 106. If a setting value for the initial screen is "FAX", a screen for the FAX function is displayed on the operation unit 106. If a setting value for the initial screen is "copy", a screen for the copy function is displayed on the operation unit 106.

In FIG. 3A, personal-use setting values are stored in a storage area and device-use setting values are stored in another storage area. However, as in FIG. 3B, personal-use setting values and device-use setting values may also be stored in the same storage area. In the case as in FIG. 3B, a special user identifier is allocated to the device and the special user identifier (identification information for identifying the device) is associated with the device-use setting values.

In FIGS. 3A and 3B, as an example of setting values, a setting value for the display language and a setting value for the initial screen are illustrated; however, there may be setting values other than these setting values.

Figure 4:
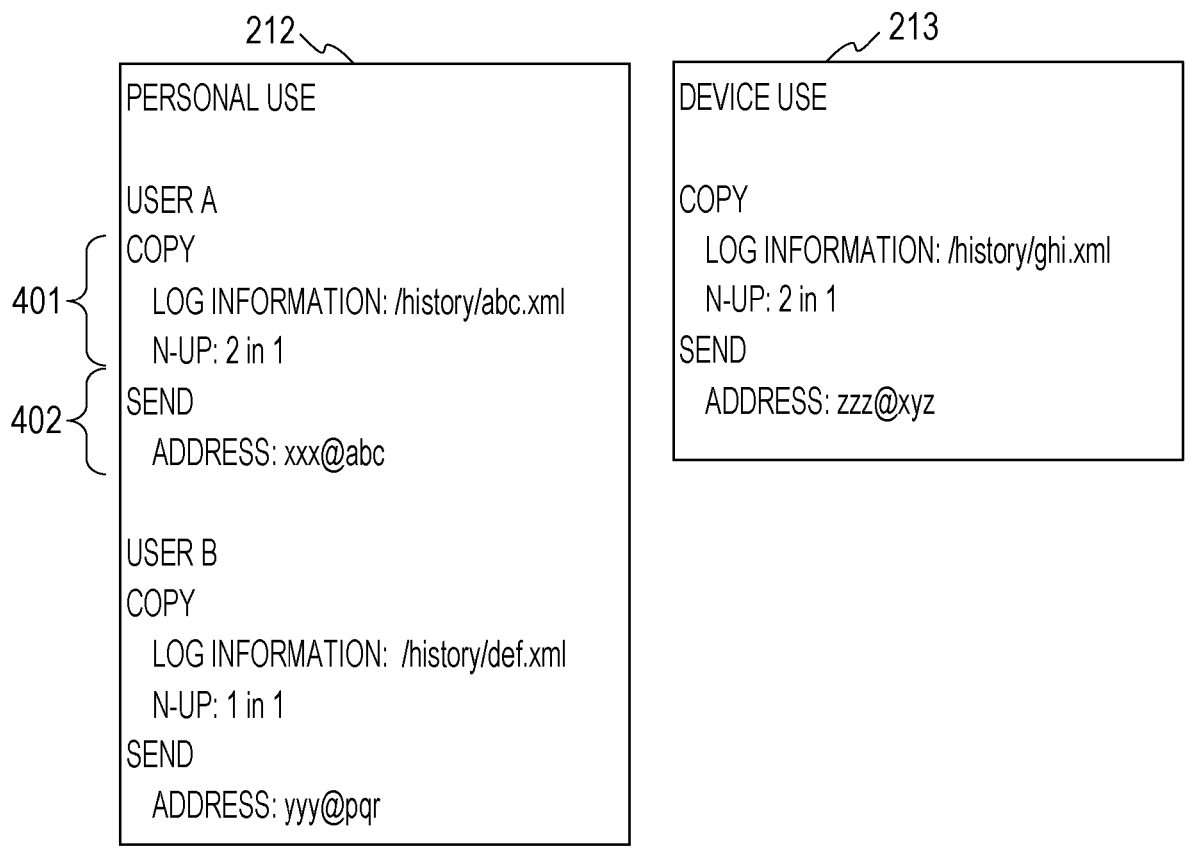
FIG. 4 is a diagram illustrating an example of setting values necessary after login.

FIG. 4 is a diagram illustrating an example of the setting value group 211 necessary after login. In the storage area 212, setting values for the user A and setting values for the user B are stored. In the storage area 213, device-use setting values are stored.

In the storage area 212, setting values necessary after login are stored on a user by user basis and on a function by function basis. In addition, in the storage area 213, setting values necessary after login are stored on a function by function basis. For example, setting values for the user A necessary after login are classified into setting values 401 necessary for the copy function and a setting value 402 necessary for the send function. Setting values for the copy function include a setting value for log information and a setting value for a layout. A setting value for the send function is a setting value for a receiving address. Log information is a file path for storing setting log for copying. A layout indicates the number of pages to be printed on a single sheet. A receiving address is an e-mail address of a destination to which image data is to be sent through the send function.

Depending on a user, there may be a function for which no setting values are set. For functions that a user does not use, setting values do not have to be stored.

In the case where the user A uses the copy function, the CPU 101 acquires the setting values 401 associated with the user A for the copy function and controls the copy function on the basis of the acquired setting values. For example, the CPU 101 acquires a setting value for log information, reads settings for copying performed in the past from a file indicated by the acquired setting value, and causes the operation unit 106 to display the settings for copying performed in the past. As a result, the user A may reuse the settings for copying used in the past. In addition, the CPU 101 acquires a setting value for a layout, generates image data that needs to be printed in accordance with the setting value, and prints the generated image data on a sheet.

This similarly applies to the other functions. In the case where a user uses a certain function among the functions, the CPU 101 acquires a setting value for the function, causes a screen to be displayed on the basis of the acquired setting value, and executes the function on the basis of the acquired setting value.

Figure 5:
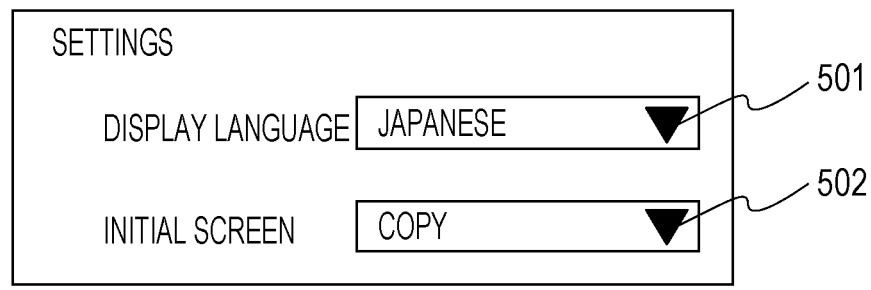
FIG. 5 is a diagram illustrating a setting screen through which setting values necessary for login are set.

Setting values necessary for login and setting values necessary after login are set using the operation unit 106 and stored in the HDD 104. FIG. 5 is a diagram illustrating a setting screen through which setting values necessary for login are set, the setting screen being a screen to be displayed on the operation unit 106. When a user presses a pull-down button 501, the CPU 101 causes the operation unit 106 to display a list of languages that may be selected as a display language. The user selects one language from the list. When the user presses a pull-down button 502, the CPU 101 causes the operation unit 106 to display a list of functions individually associated with screens that may be selected as an initial screen. The user selects one function from the list. In the case where each user sets setting values necessary for login on the setting screen illustrated in FIG. 5, the setting values are associated with the user and stored in the HDD 104. In the case where an administrator of the information processing apparatus sets setting values necessary for login through the setting screen illustrated in FIG. 5, the setting values are stored, in the HDD 104, as device-use setting values. In the case where the user or the administrator changes, on the setting screen as illustrated in FIG. 5, setting values that have already been set, the changed setting values are stored in the RAM 102. That is, the setting values stored in the RAM 102 are updated to the changed setting values. Then, the changed setting values stored in the RAM 102 are stored in the HDD 104.

Figure 6:
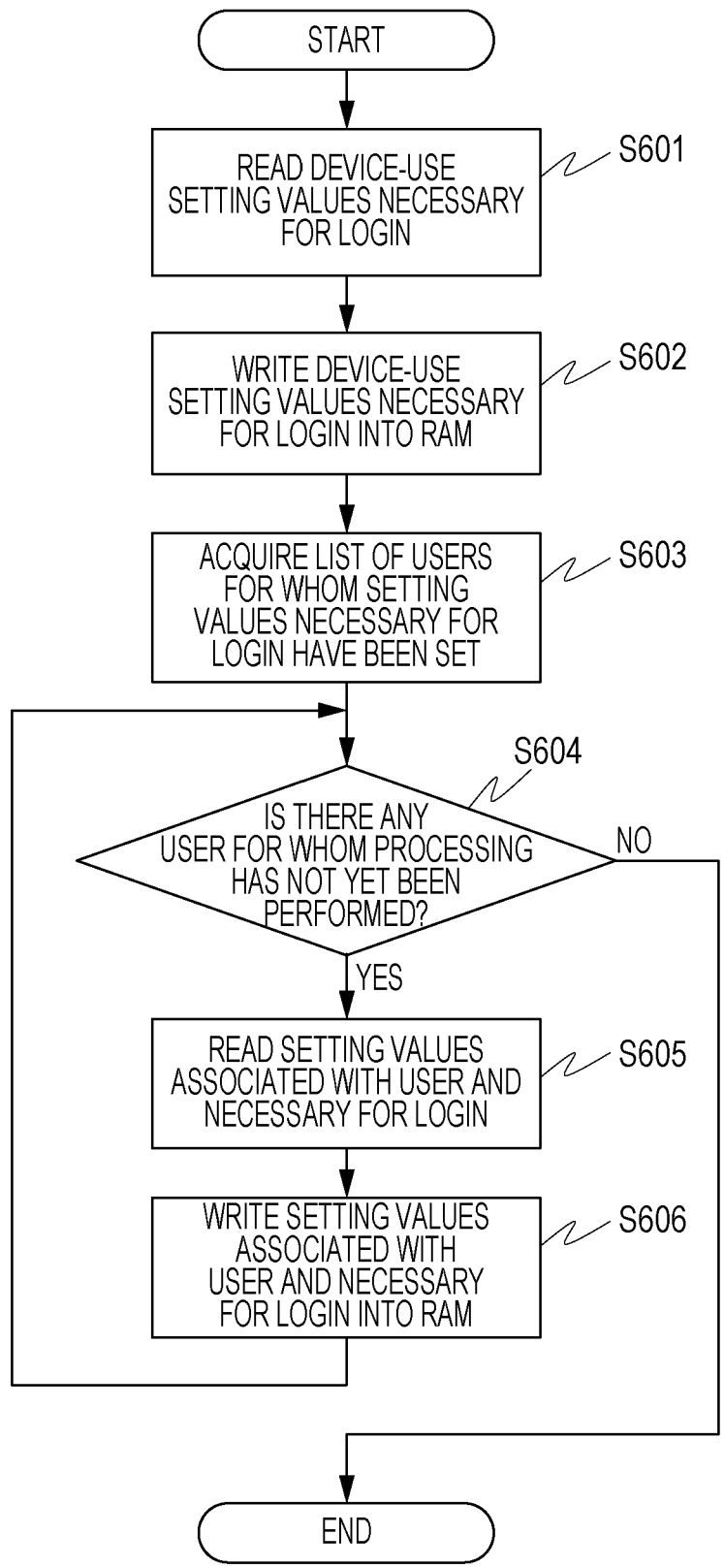
FIG. 6 is a flowchart illustrating a start-up process to be performed in the information processing apparatus.

A start-up process to be performed in the information processing apparatus will be described using a flowchart of FIG. 6. FIG. 6 is a flowchart illustrating a start-up process to be performed in the information processing apparatus. The CPU 101 executes a program based on the flowchart as illustrated in FIG. 6 and executes the start-up process.

The CPU 101 reads, from the HDD 104, device-use setting values necessary for login (S601) and writes the read device-use setting values into the RAM 102 (S602).

The CPU 101 acquires, from the HDD 104, a list of a user or users for whom setting values necessary for login have been set (S603). The CPU 101 determines whether or not there is a user who has not yet been selected from the list of a user or users, in accordance with the list of a user or users (S604). If there are no users who have not yet been selected from the list of a user or users, the CPU 101 ends the start-up process. Also in the case where there are no users for whom setting values necessary for login have been set, the CPU 101 ends the start-up process.

In the case where there is a user who has not yet been selected from the list of a user or users, the CPU 101 selects the user from the list of a user or users and reads setting values associated with the user and necessary for login from the HDD 104 (S605). Furthermore, the CPU 101 writes the read setting values into the RAM 102 (S606).

In this manner, the device-use setting values necessary for login and the setting values necessary for login for all the users are loaded in the RAM 102, and then these setting values may be accessed at a high speed.

A login process for users will be described. In order to log in to the information processing apparatus, each user inputs authentication information such as a user name and a password on an authentication screen displayed on the operation unit 106. The CPU 101 acquires the authentication information input using the operation unit 106 via the operation unit I/F 105, verifies the authentication information, and determines whether or not the user is allowed to log in to the information processing apparatus. An authentication method may also be a method in which authentication information input using the operation unit 106 is compared with authentication information stored uniquely in the information processing apparatus. In addition, the authentication method may also be a method in which authentication information input using the operation unit 106 is sent to an authentication server such as a directory server and an authentication result is received from the authentication server.

A method for acquiring authentication information may be a method in which authentication information input using the operation unit 106 is acquired or may also be a method in which authentication information is acquired from a card owned by a user via a card reader (not illustrated in FIG. 1).

Upon determining that the user is allowed to log in to the information processing apparatus, the CPU 101 acquires user information of the user from the HDD 104. User information is information associated with a user, and includes a user name, the full name of the user, a user identifier (for example, a UUID, which uniquely identifies a user) and the like.

The CPU 101 determines whether or not setting values associated with the user identifier and necessary for login are stored in the RAM 102. If the setting values are stored, the CPU 101 acquires the setting values from the RAM 102. If the setting values associated with the user identifier and necessary for login are not stored in the RAM 102, the CPU 101 acquires device-use setting values necessary for login from the RAM 102.

The CPU 101 executes necessary processing for each of the setting values acquired from the RAM 102. For example, in the case where a setting value for the display language and a setting value for the initial screen have been acquired, the CPU 101 changes the display language and controls the operation unit 106 such that a specified initial screen is displayed in a specified display language.

As an example of a setting value other than the setting values illustrated in FIGS. 3A and 3B, there is a setting value for accessibility. When a setting value indicating that screen color inversion is necessary is stored in the RAM 102, the CPU 101 controls the operation unit 106 such that a screen is displayed in which screen colors are inverted. In addition, in the case where a setting value indicating that voice recognition is necessary is stored in the RAM 102, the CPU 101 executes processing necessary for voice recognition.

The login process is performed at a high speed by acquiring setting values necessary for login from the RAM 102. For example, a screen to be displayed after login may be displayed at a high speed and the screen, which is displayed, differs from user to user.

For example, the case will be described where the user A and the user B individually log in to the information processing apparatus. FIG. 7 is a diagram illustrating an example of a screen to be displayed after login.

Since there used to be only device-use setting values, either when the user A logs in or when the user B logs in, a screen as illustrated in FIG. 7A is displayed. The screen of FIG. 7A is a menu screen for selecting functions provided by an image processing apparatus, and the display language of the screen is Japanese. In the case where the user A wants an English screen, after the screen of FIG. 7A has been displayed, the user needs to perform an operation in which the display language is changed from Japanese to English. In addition, in the case where a function frequently used by the user A is a send function, after the screen of FIG. 7A is displayed, the user A needs to select an icon 701 corresponding to the send function. In either case, such an operation is troublesome.

Figure 7B:
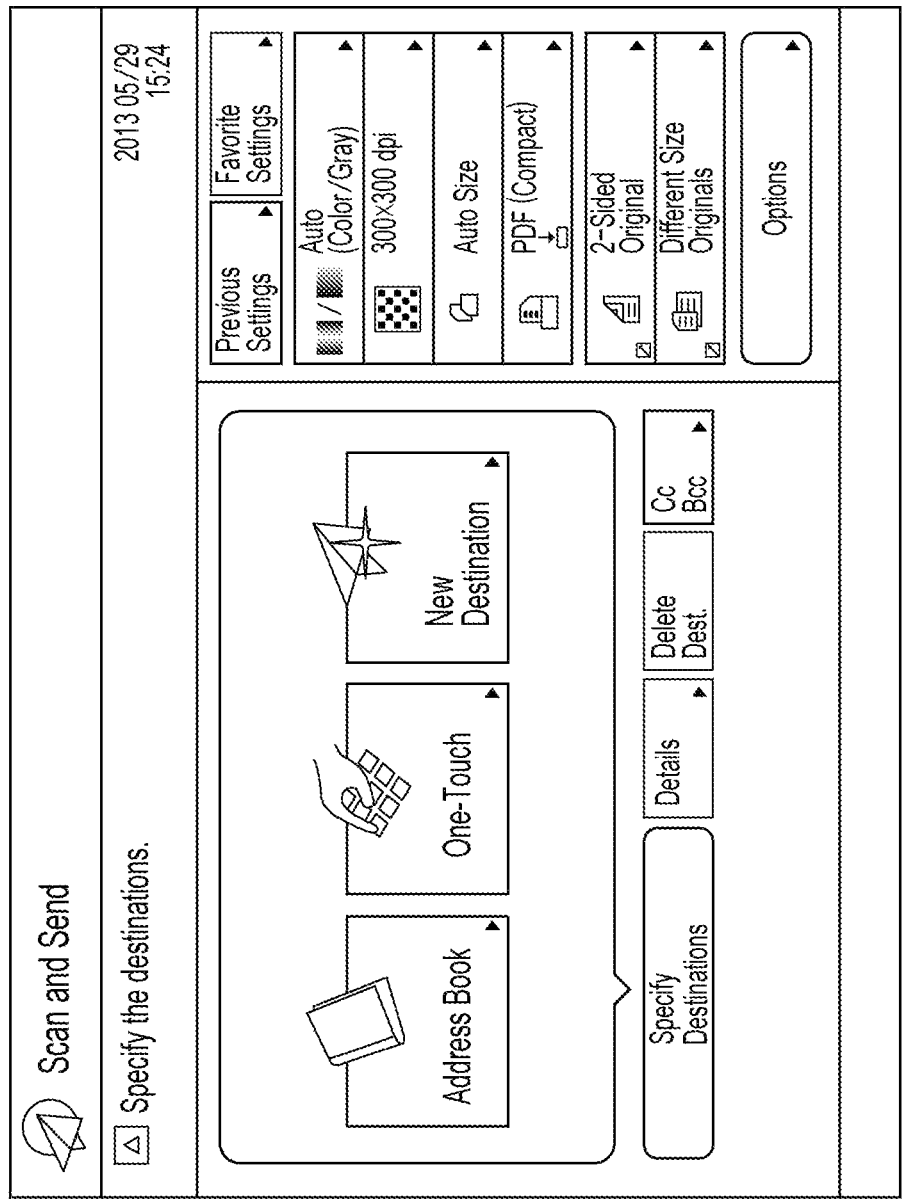
Figure 7C:
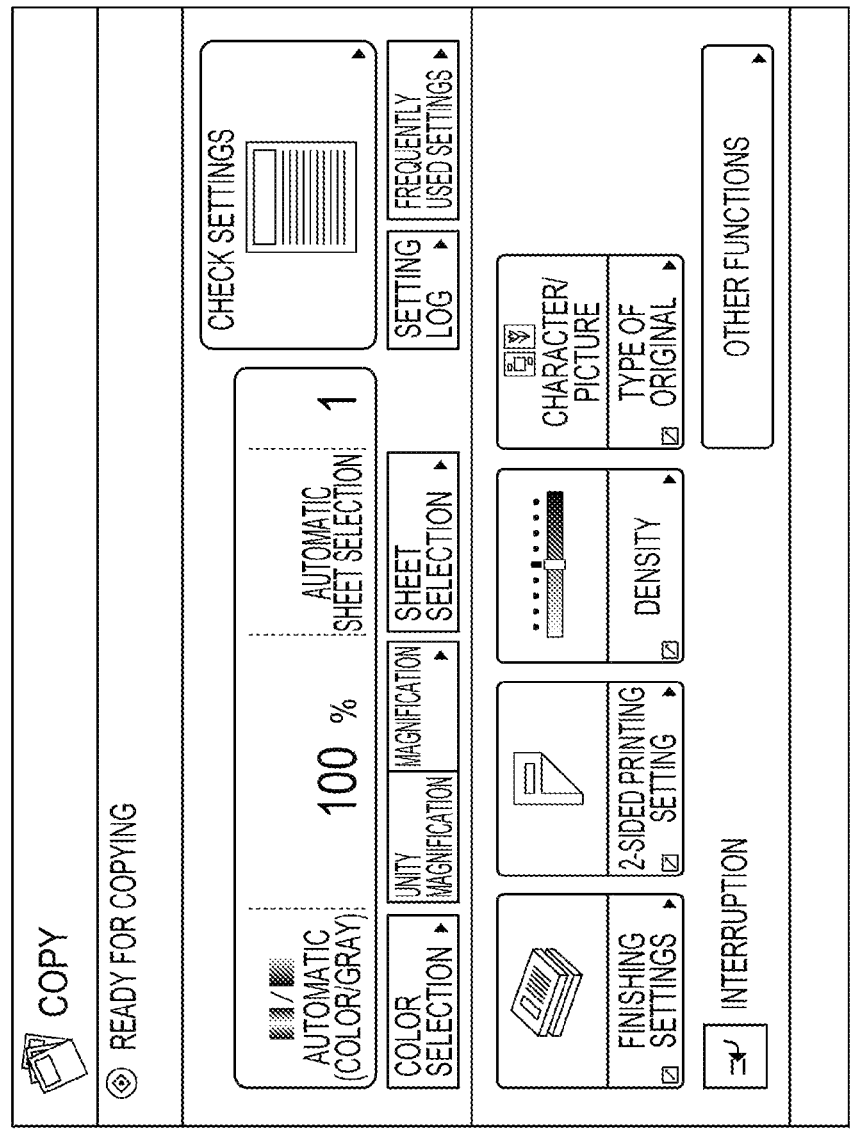

In the present embodiment, setting values necessary for login may be provided on a user by user basis. For example, suppose that the user A and the user B have set setting values as illustrated in FIGS. 3A and 3B. Then, in the case where the user A has logged in to the information processing apparatus, a screen of FIG. 7B is displayed. The screen of FIG. 7B is a screen for the send function, and the display language of the screen is English. The user A may use the send function soon, which the user A normally frequently uses. In the case where the user B has logged in to the information processing apparatus, a screen of FIG. 7C is displayed. The screen of FIG. 7C is a screen for the copy function, and the display language of the screen is Japanese.

When a user's login is completed, the CPU 101 reads setting values associated with the user, who has logged in, and necessary after login from the HDD 104, and writes the setting values into the RAM 102. User-identification information used here is also a user name or a user identifier. Since setting values necessary after login have been stored in the RAM 102, when the CPU 101 executes a function specified by a user, the CPU 101 may access setting values necessary for the specified function at a high speed.

Since the RAM 102 has a capacity, the number of setting values that may be stored is limited. In the present embodiment, setting values for one user necessary after login are stored in the RAM 102. Thus, when another user logs in, the CPU 101 clears, from the RAM 102, setting values associated with the last user who logged in and necessary after login.

Figure 8:
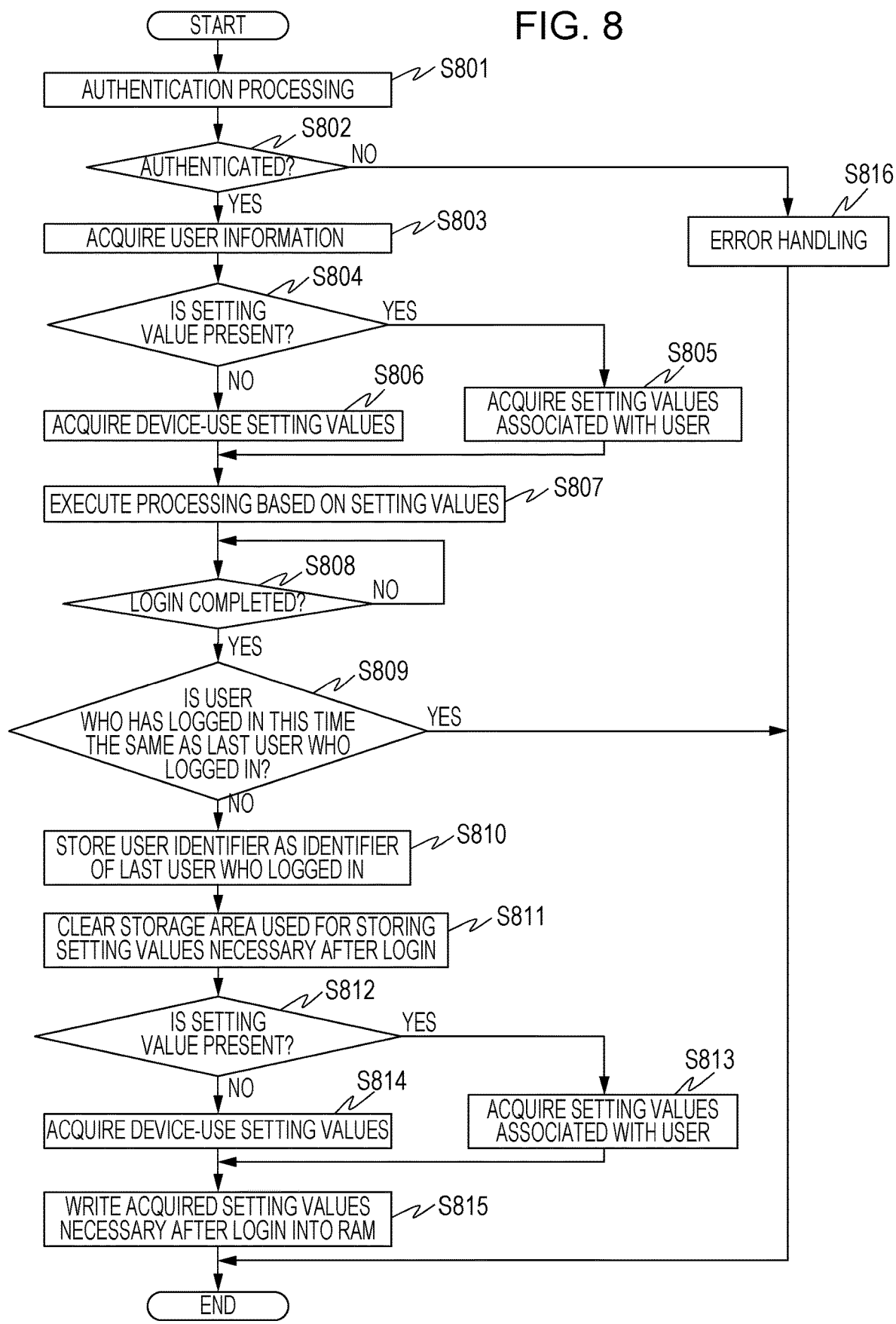
FIG. 8 is a flowchart illustrating a login process to be performed in the information processing apparatus.

A login process to be performed in the information processing apparatus will be described using a flowchart of FIG. 8. FIG. 8 is a flowchart illustrating a login process to be performed in the information processing apparatus. The CPU 101 executes a program based on the flowchart as illustrated in FIG. 8 and executes the login process.

The CPU 101 acquires authentication information input using the operation unit 106 or the like and executes authentication processing in which the input authentication information is compared with preregistered authentication information (S801). The CPU 101 determines whether or not a user is allowed to log in to the information processing apparatus on the basis of an authentication result (S802). That is, in the case where authentication is successful, it is determined that the user is allowed to log in to the information processing apparatus.

In the case where the user is not allowed to log in to the information processing apparatus, the CPU 101 executes error handling such as display of an error screen (S816).

In the case where the user is allowed to log in to the information processing apparatus, the CPU 101 acquires user information corresponding to the user from the HDD 104 (S803). Next, the CPU 101 determines whether or not a setting value associated with a user identifier included in the user information acquired in S803 and necessary for login is present in the RAM 102 (S804). In the case where it is determined that such a setting value is present, the CPU 101 acquires setting values associated with the user identifier and necessary for login from the RAM 102 (S805). In the case where it is determined that such a setting value is not present, the CPU 101 acquires device-use setting values necessary for login from the RAM 102 (S806).

The CPU 101 executes processing based on the setting values acquired in S805 or S806 (S807). Specifically, the CPU 101 causes the operation unit 106 to display a screen that is to be displayed after login, on the basis of a setting value for the display language and a setting for the initial screen.

The CPU 101 determines whether or not processing based on the setting values has been completed and a login has been completed (S808). In the case where the login has not been completed, the CPU 101 continues to execute processing based on the setting values. In the case where the login has been completed, the CPU 101 determines whether or not the user identifier acquired in S803 is the same as the user identifier of the last user who logged in (S809). The user identifier of the last user who logged in is stored in the RAM 102.

When the two user identifiers are the same, setting values associated with the user and necessary after login have already been stored in the RAM 102. Thus, the CPU 101 executes various functions using the setting values. In this case, processing for reading setting values from the HDD 104 and writing the setting values into the RAM 102 is omitted. In the case where the same user logs in successively, unnecessary processing may be reduced by not reading the same setting values two times from a low-speed storage device such as the HDD 104.

In the case where the two user identifiers are not the same, the CPU 101 stores, in the RAM 102, the user identifier acquired in S803 as the user identifier of the last user who logged in (S810). As a result, the user identifier stored in the RAM 102 in S810 is to be used when S809 is executed next time.

The CPU 101 clears a storage area for storing setting values necessary after login on the RAM 102 (S811).

The CPU 101 determines whether or not a setting value associated with the user identifier acquired in S803 and necessary after login is present in the HDD 104 (S812). In the case where it is determined that such a setting value is present, the CPU 101 acquires setting values associated with the user identifier and necessary after login from the HDD 104 (S813). In the case where it is determined that such a setting value is not present, the CPU 101 acquires device-use setting values necessary after login from the HDD 104 (S814). The CPU 101 writes the read setting values acquired in S813 or S814 into the RAM 102 (S815). Thereafter, the CPU 101 executes various functions using setting values stored in the RAM 102 and necessary after login.

An acquisition process will be described in which setting values are acquired for executing functions. Personal-use setting values include setting values necessary for login and setting values necessary after login. Examples of setting values necessary after login are setting values to be used for functions. The CPU 101 acquires setting values to be used for functions in order to execute the functions. For example, in the case where a user uses a copy function, the CPU 101 acquires a setting value associated with the user identifier of the user and used for the copy function.

FIG. 9 is a flowchart illustrating an acquisition process to be performed in the information processing apparatus. The CPU 101 executes a program based on the flowchart as illustrated in FIG. 9 and executes the acquisition process.

The CPU 101 executes the program based on the flowchart illustrated in FIG. 9 and a program that controls a certain function in parallel. In addition, the information processing apparatus may include a control circuit that controls a certain function other than the CPU 101. In the following, a program that controls functions and a controller that controls functions are collectively called a "function controller".

The CPU 101 receives, from a function controller, a function name that specifies a function, a user identifier of a user who uses the function, a setting value name of a setting value that is necessary for the function, and an acquisition request for the setting value (S901). The function name is, for example, a "copy function".

The CPU 101 determines whether or not a setting value associated with the user identifier and corresponding to the function name is present in the RAM 102 (S902). In the case where such a setting value is present, the CPU 101 acquires, from the RAM 102, a setting value associated with the function name from among setting values associated with the user identifier and necessary after login (S903).

In the case where it is determined that such a setting value is not present, the CPU 101 determines whether or not a setting value that is a device-use setting value and corresponds to the function name is present in the RAM 102 (S904). In the case where such a setting value is present, the CPU 101 acquires, from the RAM 102, a setting value associated with the function name from among device-use setting values necessary after login (S905).

The CPU 101 sends the setting value acquired in S903 or S905 to the function controller that has issued the acquisition request for the setting value (S906). The function controller executes the function on the basis of the setting value.

In the case where a setting value associated with the function name is not present not only in the setting values associated with the user but also in the device-use setting values, the CPU 101 returns an error to the function controller (S907).

A setting process for setting values will be described.

FIG. 10 is a diagram illustrating an example of a list of setting values necessary for login. In the example of FIG. 10, a setting value for the display language and a setting value for the initial screen are setting values necessary for login. Other setting values may also be included in the list. The list has been stored in the HDD 104 or the ROM 103 in advance. When the information processing apparatus is started up, the CPU 101 reads the list from the HDD 104 or the ROM 103 and writes the list into the RAM 102. The CPU 101 determines whether each setting value is necessary for login or after login in accordance with the list.

Figure 11:
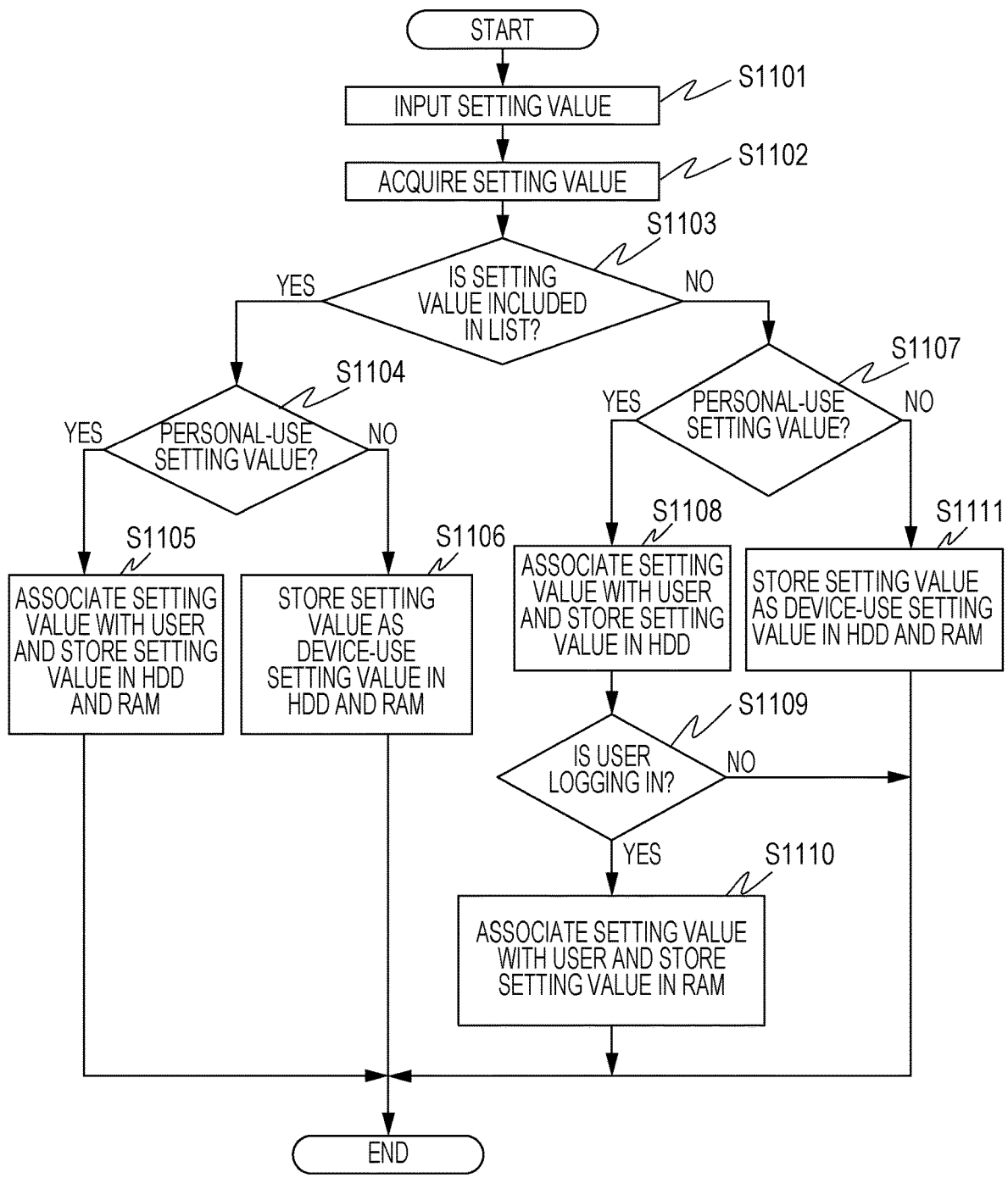
FIG. 11 is a flowchart illustrating a setting process to be performed in the information processing apparatus.

FIG. 11 is a flowchart illustrating a setting process to be performed in the information processing apparatus. The CPU 101 executes a program based on the flowchart as illustrated in FIG. 11 and executes the setting process.

The CPU 101 controls the operation unit I/F 105 or the network I/F 110 such that a setting value is to be received (S1101). For example, the operation unit I/F 105 controls the operation unit 106 such that a screen for receiving a setting value is displayed, and a user inputs a setting value through the screen. There are mainly two types of screen for receiving a setting value. One of the types is an initial setting screen for performing initial setting of setting values. The other one is an operation screen for each function. Also in the case where a user inputs a setting value through an operation screen for each function and requests saving of the setting value, the setting value is input to the operation unit I/F 105 via the operation unit 106. In the case where an external server manages setting values in a collective manner, the network I/F 110 sends the acquisition request for a setting value to the external server. The setting value sent by the external server in response to the acquisition request is input to the network I/F 110 via a network.

The CPU 101 acquires the setting value input to the operation unit I/F 105 or the network I/F 110 (S1102). The CPU 101 acquires, in addition to the setting value, the name of the setting value, information used to identify whether the setting value is a device-use setting value or a personal-use setting value, the user identifier of the user who has input the setting value, the function name of a function corresponding to the setting value, and the like. A setting value input through a screen available only to an administrator or a screen displayed while the administrator is logging in is a device-use setting value. In contrast, a setting value input by a certain user through a screen displayed while the user is logging in is a personal-use setting value. In the case where a setting value is input from an external server, information indicating whether the setting value is a personal-user setting value or a device-use setting value is also received. In the case where such information is not present, an empty value (for example, "0" or "NULL") is acquired. For example, in the case where a device-use setting value is input, a user identifier is not present. In the case where a setting value for a system setting is input, a function name is not present.

The CPU 101 determines whether or not the name of the setting value acquired in S1102 is included in the list of setting values necessary for login (S1103).

In the case where the name of the setting value is included in the list, the CPU 101 determines whether or not the setting value acquired in S1102 is a personal-use setting value or a device-use setting value on the basis of information used to identify whether a certain setting value is a device-use setting value or a personal-use setting value (S1104).

If the setting value is a personal-use setting value, the CPU 101 stores the setting value acquired in S1102 both in the HDD 104 and in the RAM 102 as a setting value associated with the user identifier acquired in S1102 and necessary for login (S1105). If the setting value is a device-use setting value, the CPU 101 stores the setting value acquired in S1102 both in the HDD 104 and in the RAM 102 as a device-use setting value necessary for login (S1106).

Also in the case where the name of the setting value acquired in S1102 is not included in the list, the CPU 101 determines whether the setting value acquired in S1102 is a personal-use setting value or a device-use setting value (S1107).

If the setting value is a personal-use setting value, the CPU 101 stores the setting value acquired in S1102 in the HDD 104 as a setting value associated with the user identifier acquired in S1102 and necessary after login (S1108). Furthermore, the CPU 101 determines whether or not the user corresponding to the user identifier acquired in S1102 is logging in to the information processing apparatus (S1109). If the user is logging in, the CPU 101 stores, in the RAM 102, the setting value acquired in S1102 as a setting value associated with the user identifier acquired in S1102 and necessary after login (S1110). This is because, if the user is logging in, setting values necessary after login are stored not only in the HDD 104 but also in the RAM 102. S1110 is executed to update setting values stored in the RAM 102. If the setting value is a device-use setting value, the CPU 101 stores the setting value acquired in S1102 both in the HDD 104 and in the RAM 102 as a device-use setting value necessary after login (S1111).

In the case where a setting value necessary for login is input to the network I/F 110 from an external server, there may be the case where it is not preferable that the setting value be reflected soon. For example, in the case where a setting value for the display language has been reflected soon, the display language on a screen displayed on the operation unit 106 is suddenly changed, which may baffle a user. Thus, processing of S1105 is not executed soon after a setting value is acquired from an external server, and the setting value acquired in S1102 is temporarily saved in a buffer memory or a cache memory (not illustrated in FIG. 1). When a user logs out from the information processing apparatus, the temporarily stored setting value is stored both in the HDD 104 and in the RAM 102.

A logout process for a user will be described.

In the present embodiment, even in the case where a user logs out, setting values stored in the RAM 102 are not cleared soon, as a preparation to the case where the same user logs out and in successively. However, in the case where a user logs out, setting values associated with the user may also be changed to device-use setting values. For example, when a user logs in, a screen may be displayed on the basis of a setting value associated with the user for the display language. When a user logs out, a screen may also be displayed on the basis of a device-use setting value for the display language.

In addition, when a user logs out from the information processing apparatus, the CPU 101 may also delete setting values associated with the user and necessary after login from the RAM 102. When a user inputs a command for logout using the operation unit 106, the CPU 101 clears a storage area where setting values associated with the user and necessary after login on the RAM 102. In this case, every time the user logs in the information processing apparatus, setting values necessary after login are transferred from the HDD 104 to the RAM 102.

According to the above-described first embodiment, before each user logs in to the information processing apparatus, setting values necessary for login are transferred from a first storage device to a second storage device, which may be accessed at a higher speed than the first storage device, the first storage device being a nonvolatile storage device, the second storage device being a volatile storage. As a result, the login process is performed at a higher speed, an operation screen desired by the user is displayed sooner on the operation unit 106, and the user may use the information processing apparatus sooner. In addition, setting values necessary after login are also transferred from the first storage device to the second storage device before functions are executed, and thus, for each function, a setting value necessary for the function may be acquired sooner.

That is, in an information processing apparatus that moves setting information associated with each user from a first storage unit to a second storage unit and uses the setting information, it is possible to prepare setting information for a greater number of users in the second storage unit. In addition, the size of setting information to be stored in the second storage means may be further reduced.

Second Embodiment

In a second embodiment, setting values necessary after login are loaded in the RAM 102 in descending order of probabilities of the functions being used. The second embodiment will be described using FIGS. 12 to 13B. In the second embodiment, information illustrated in FIG. 12 is prepared and a login process illustrated in FIGS. 13A and 13B is executed instead of the login process illustrated in FIG. 8.

In the second embodiment, priorities are preset for a plurality of functions. Each user may set priorities for a plurality of functions in descending order of probabilities of the functions being used after login. Alternatively, the CPU 101 may set priorities for a plurality of functions in descending order of probabilities of the functions being used after login, on the basis of a use log of each function. In the following, priorities for a plurality of functions are set on a user by user basis. However, priorities for the plurality of functions may be set only for the information processing apparatus. Priority information indicating priorities for the plurality of functions is stored in the HDD 104.

Figure 12:
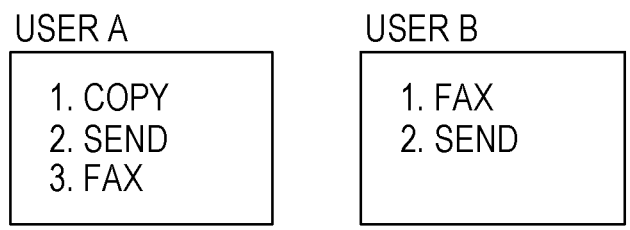
FIG. 12 is a diagram illustrating priority information stored in the HDD.

FIG. 12 is a diagram illustrating an example of priority information stored in the HDD 104. In the example of FIG. 12, priority information is stored on a user by user basis. Since the user A uses the copy function most frequently, the copy function is ranked number 1, the send function number 2, and the FAX function number 3. Since the user B uses the FAX function most frequently and does not use the copy function very often, the FAX function is ranked number 1 and the copy function is not ranked.

Figure 13A:
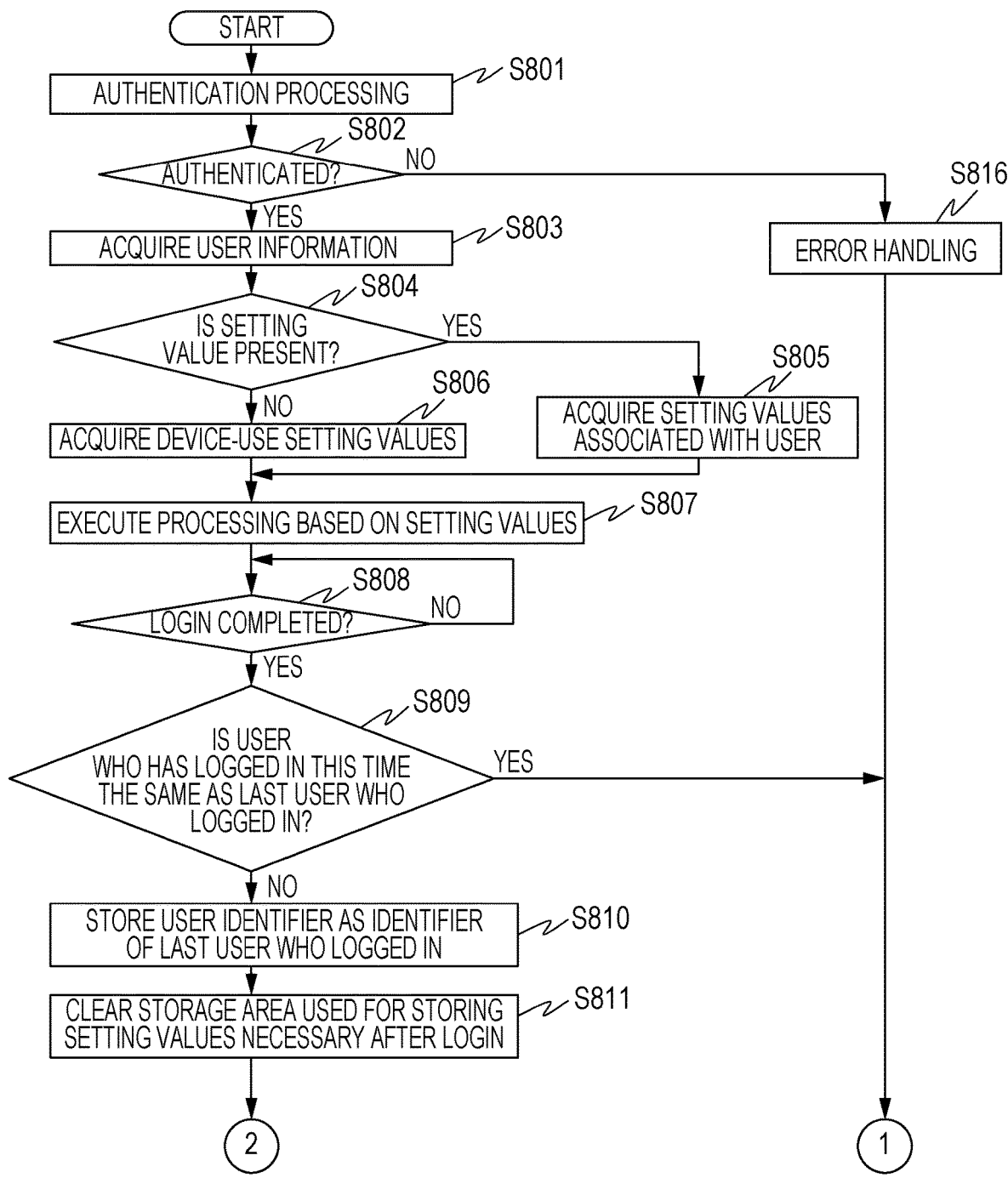
FIGS. 13A and 13B are a flowchart illustrating a login process to be performed in the information processing apparatus.
Figure 13B:
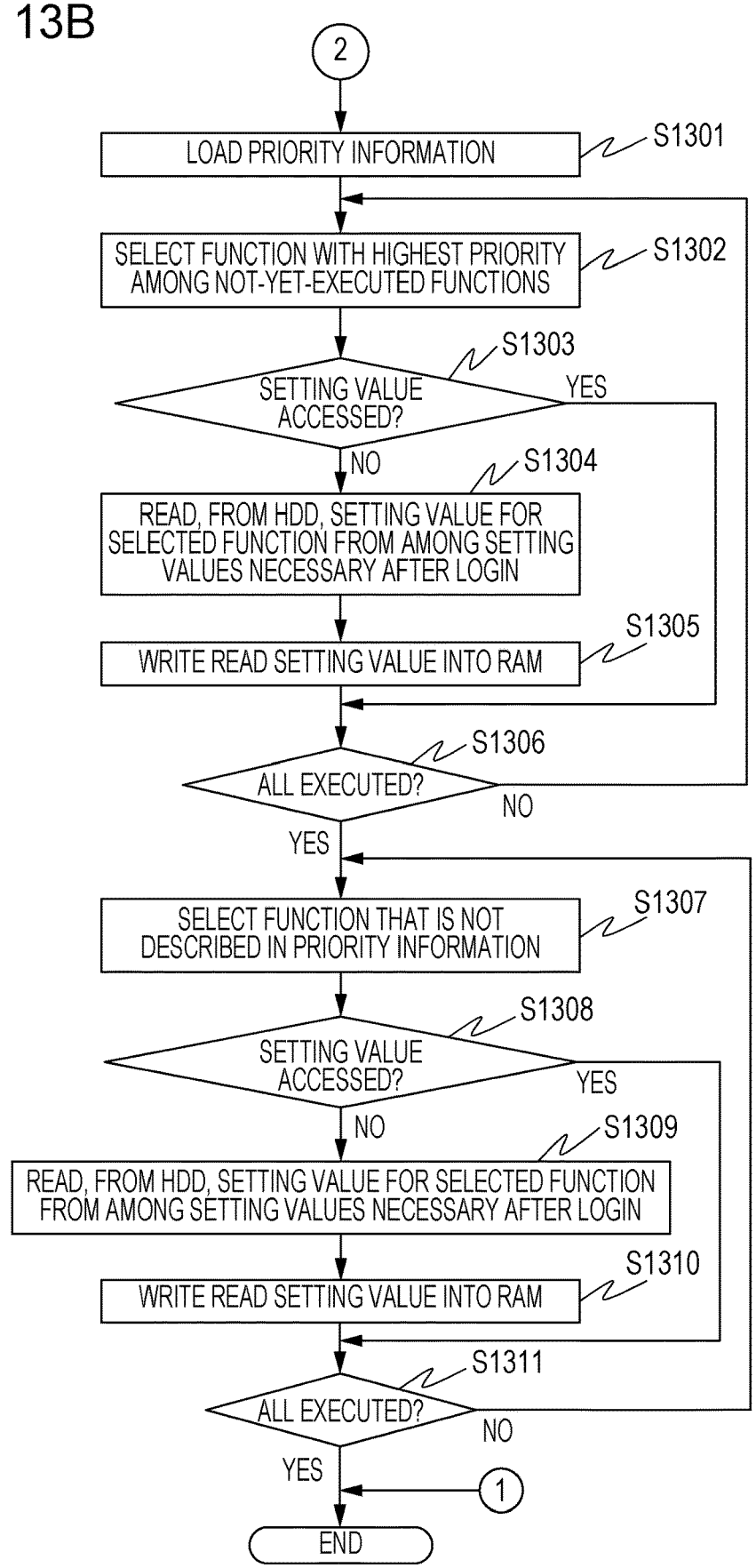

FIGS. 13A and 13B are a flowchart illustrating a login process to be performed in the information processing apparatus. The CPU 101 executes a program based on the flowchart as illustrated in FIGS. 13A and 13B and executes the login process according to the second embodiment. S801 to S811 and S816 of FIG. 13A are the same as S801 to S811 and S816 of FIG. 8. Thus, a description of S801 to S811 and S816 is omitted.

The CPU 101 acquires priority information corresponding to the user identifier acquired in S803 from the HDD 104 (S1301). The CPU 101 selects a function with the highest priority on the basis of the priority information from among functions for which a setting value has not yet been read from the HDD 104 (S1302). In the example of FIG. 12, the smaller the number indicating priority, the higher the priority.

Figure 14:
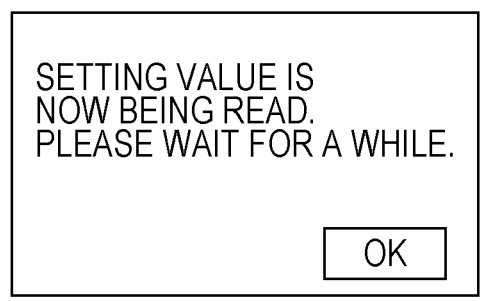
FIG. 14 is a diagram illustrating an example of a message.

The CPU 101 determines whether or not a setting value for the function selected in S1302 has already been accessed (S1303). The CPU 101 executes the program based on the flowchart illustrated in FIGS. 13A and 13B and a program that controls a certain function in parallel. In addition, the information processing apparatus may include a control circuit that controls a certain function other than the CPU 101. As a result, before the setting value is read from the HDD 104 in accordance with the flowchart of FIGS. 13A and 13B, the setting value may have already been read from the HDD 104 in response to an acquisition request from a function controller. In the case where the setting value has already been read from the HDD 104 in response to an acquisition request from a function controller and stored in the RAM 102, it is determined that the setting value has already been accessed. Note that, in the case where the setting value is being accessed in response to an acquisition request, a message indicating that is displayed on the operation unit 106. FIG. 14 is a diagram illustrating an example of a message.

In the case where the setting value has already been accessed, the process proceeds to S1306. In the case where the setting value has not yet been accessed, the CPU 101 reads, from the HDD 104, a setting value for the function selected in S1302 from among setting values associated with the user identifier acquired in S803 and necessary after login (S1304). Furthermore, the CPU 101 writes the read setting value into the RAM 102 (S1305). In the case where such a setting value is not present for the function, the CPU 101 reads, from the HDD 104, a device-use setting value for the function selected in S1302 from among the device-use setting values necessary after login, and writes the read device-use setting value into the RAM 102.

The CPU 101 determines whether or not reading of setting values has been performed for all the functions indicated in the priority information (S1306). If there is a function for which a setting value has not yet been read from the HDD 104, the process returns to S1302.

In the case where reading of setting values has been performed for all the functions indicated in the priority information, the CPU 101 selects a function that is not described in the priority information from among a plurality of functions provided by the information processing apparatus (S1307).

The CPU 101 determines whether or not a setting value for the function selected in S1307 has already been accessed (S1308). In the case where the setting value has already been accessed, the process proceeds to S1311.

In the case where the setting value has not yet been accessed, the CPU 101 reads, from the HDD 104, the setting value for the function selected in S1307 from among the setting values associated with the user identifier acquired in S803 and necessary after login (S1309). Furthermore, the CPU 101 writes the read setting value into the RAM 102 (S1310). In the case where such a setting value is not present for the function, the CPU 101 reads, from the HDD 104, a device-use setting value for the function selected in S1307 from among the device-use setting values necessary after login, and writes the read device-use setting value into the RAM 102.

The CPU 101 determines whether or not reading of setting values has been performed for all the functions that are not indicated in the priority information (S1311). If there is a function for which a setting value has not yet been read from the HDD 104, the process returns to S1307.

The priority information illustrated in FIG. 12 defines functions for which setting values are to be transferred to the RAM 102. However, limitation information may also be prepared in which functions for which setting values do not have to be transferred to the RAM 102 are defined. For example, if setting values for functions that a user does not usually use, a large-sized setting value, or the like is transferred to the RAM 102, a certain amount of space of the RAM 102 is taken up, the RAM 102 having a smaller capacity than the HDD 104. There may be the case where setting values for functions that are not usually used or a large-sized setting value is transferred to the RAM 102 and setting values for functions with higher probability of being used are not transferred in advance to the RAM 102 and stay in the HDD 104, which is slower than the RAM 102. Setting values for functions that are not usually used and a large-sized setting value are not transferred in advance to the RAM 102 and have only to be transferred from the HDD 104 to the RAM 102 as the need arises.

Figure 15:
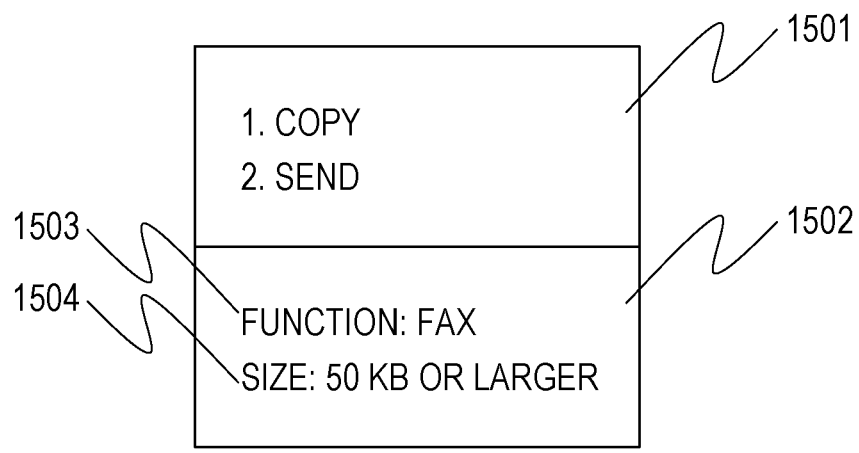
FIG. 15 is a diagram illustrating an example of priority information and limitation information.

FIG. 15 is a diagram illustrating an example of priority information and limitation information. In the example of FIG. 15, priority information 1501 and limitation information 1502 are associated with the user A. Similarly to the priority information of FIG. 12, the priority information 1501 indicates the order of functions with high probabilities of being used by the user A. The limitation information 1502 indicates conditions under which setting values are determined that do not need to be transferred to the RAM 102. Each user may set conditions under which setting values are determined that do not need to be transferred to the RAM 102. Alternatively, the CPU 101 may set conditions under which setting values are determined that do not need to be transferred to the RAM 102, on the basis of the use log of each function.

A condition 1503 indicates the name of a function for which a setting value does not need to be transferred to the RAM 102. A condition 1504 indicates the size of a setting value that does not need to be transferred to the RAM 102. In the example of FIG. 15, although only two conditions are described, other conditions may also be described.

In the example of FIG. 15, a setting value for the FAX function is not transferred from the HDD 104 to the RAM 102 in S1309 and S1310 of FIG. 13B. Alternatively, the FAX function may be caused not to be selected in S1307. A setting value the size of which is 50 KB or larger is not also transferred from the HDD 104 to the RAM 102 in S1309 and S1310 of FIG. 13B. In the above-described description, the condition 1504 is applied only to functions that are not described in the priority information. However, the condition 1504 may also be applied to functions described in the priority information.

Note that a setting value that matches a condition described in the limitation information 1502 is not read from the HDD 104 when the login process of FIGS. 13A and 13B is executed but read from the HDD 104 upon reception of an acquisition request for the setting value from a function controller.

It may be prevented using the limitation information 1502 that setting values are unintentionally loaded in a volatile storage device, which has a relatively small capacity, and even unnecessary setting values are loaded in the volatile storage device.

According to the second embodiment, as a result of loading, on a priority basis, setting values with high possibilities of being used to a volatile storage device which can be accessed at a high speed, a user may use the functions sooner after the user's login. In addition, as a result of not reading unnecessary setting values, a volatile storage device, which has a relatively small capacity, may be efficiently utilized.

Third Embodiment

In a third embodiment, setting values for functions corresponding to a screen set as the initial screen are given first priority, read from the HDD 104, and written into the RAM 102. As a result, a user may use soon a function corresponding to the initial screen, which is displayed after login. In the third embodiment, a login process illustrated in FIG. 16 is executed instead of the login process illustrated in FIG. 8.

Figure 16:
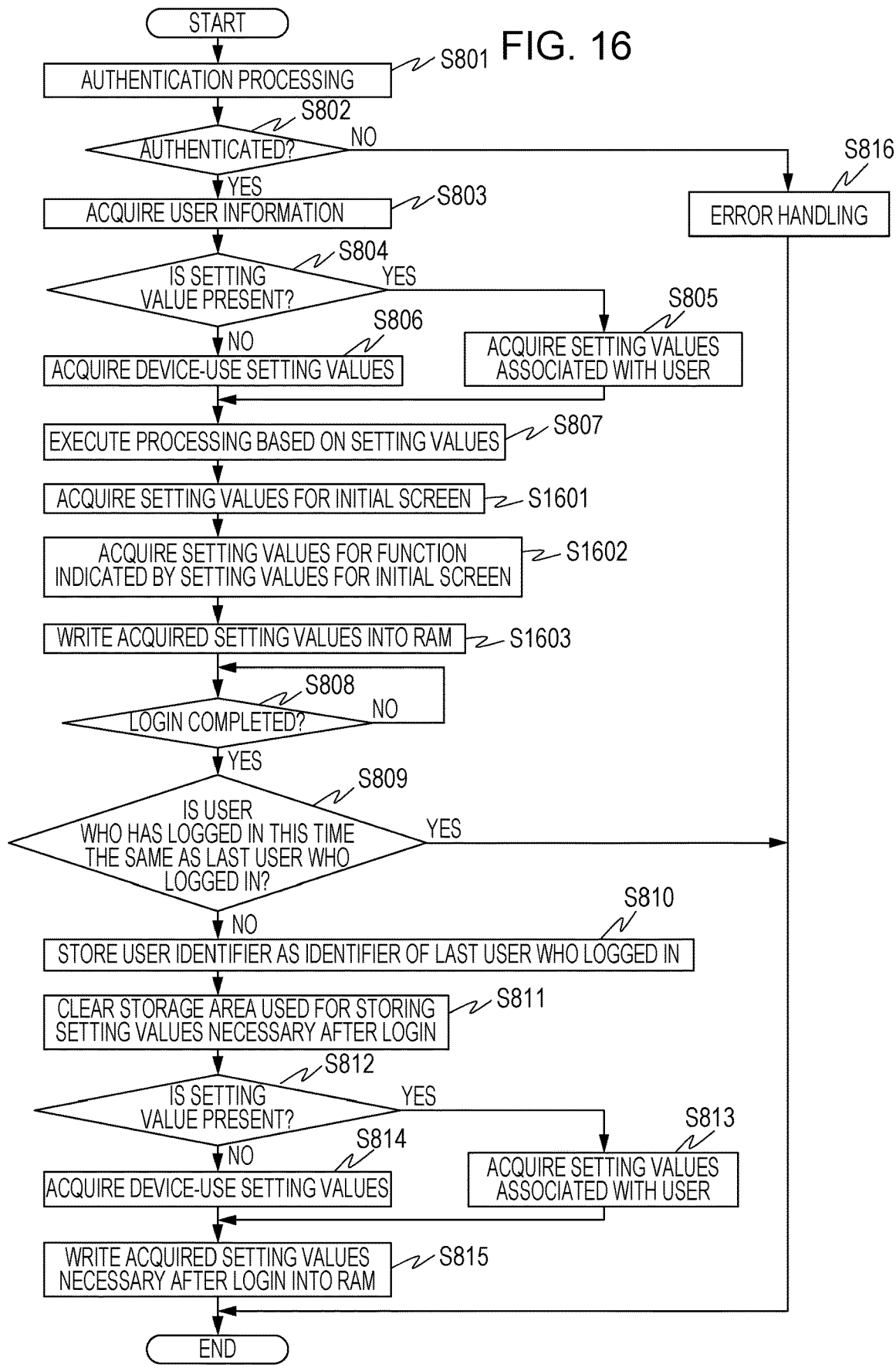
FIG. 16 is a flowchart illustrating a login process to be performed in the information processing apparatus.

FIG. 16 is a flowchart illustrating a login process to be performed in the information processing apparatus. The CPU 101 executes a program based on the flowchart as illustrated in FIG. 16 and executes the login process according to the third embodiment. S801 to S815 of FIG. 16 are the same as S801 to S815 of FIG. 8. Thus, a description of S801 to S815 is omitted.

After executing processing based on setting values necessary for login, the CPU 101 acquires setting values for the initial screen from among the setting values written into the RAM 102 in S805 or S806 (S1601). Next, the CPU 101 reads, from the HDD 104, setting values for functions indicated by the setting values for the initial screen from among the setting values associated with the user identifier acquired in S803 and necessary after login (S1602). Furthermore, the CPU 101 writes the read setting values into the RAM 102 (S1603). In the case where such a setting value is not present for the function, the CPU 101 reads, from the HDD 104, device-use setting values for the functions indicated by the setting values for the initial screen from among the device-use setting values necessary after login, and writes the read device-use setting values into the RAM 102.

FIG. 16 has been described as a modified example of FIG. 8. However, a process from S1601 to S1603 may also be included in the flowchart of FIGS. 13A and 13B. In that case, the process from S1601 to S1603 is executed between S807 and S808 of FIG. 13A.

According to the third embodiment, as a result of loading, on a priority basis, setting values for functions corresponding to a screen displayed first after login to a volatile storage device which can be accessed at a high speed, a user may use the functions sooner after the user's login.

Fourth Embodiment

Figure 17:
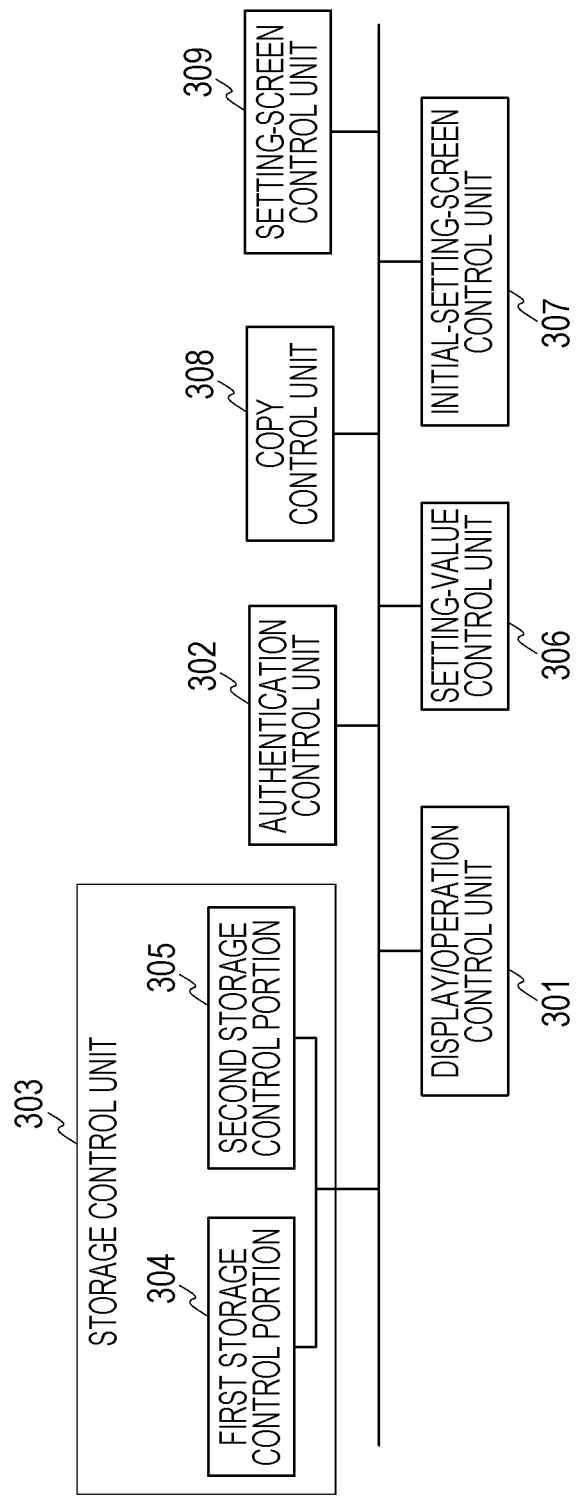
FIG. 17 is a block diagram representing roles played by a CPU in first to third embodiments.

FIG. 17 is a block diagram representing roles played by the CPU 101 in the first to third embodiments.

A display/operation control unit 301 causes the operation unit 106 to display a screen by controlling the operation unit I/F 105. In addition, the display/operation control unit 301 acquires, via the operation unit I/F 105, information input using the operation unit 106 by a user, and send the information to another control unit.

An authentication control unit 302 executes an authentication process for login, acquires user information of a user who has logged in, and send the user information to the other control unit. The authentication control unit 302 notifies the other control unit of events each of which corresponds to one of the start of login, the completion of login, and logout.

A storage control unit 303 receives data from the other control unit and writes the data into the RAM 102 or the HDD 104. In addition, the storage control unit 303 reads data from the RAM 102 or the HDD 104 and send the data to the other control unit. The storage control unit 303 includes a first storage control portion 304 configured to control reading/writing of data from/into the HDD 104 and a second storage control portion 305 configured to control reading/writing of data from/into the RAM 102. The storage control unit 303 also controls reading of data from the ROM 103.

A setting-value control unit 306 commands the first storage control portion 304 or the second storage control portion 305 to read/write a setting value. In the case where a setting value is loaded in the RAM 102 from the HDD 104, the setting-value control unit 306 commands the first storage control portion 304 to read a setting value, and the first storage control portion 304 sends the setting value read from the HDD 104 to the setting-value control unit 306. Furthermore, the setting-value control unit 306 commands the second storage control portion 305 to write the setting value, and the second storage control portion 305 writes the setting value into the RAM 102. Upon receiving an event indicating the completion of login and a user identifier from the authentication control unit 302, the setting-value control unit 306 commands the first storage control portion 304 to read a setting value corresponding to the user identifier. The setting-value control unit 306 commands the second storage control portion 305 to write the setting value.

An initial-setting-screen control unit 307 commands the display/operation control unit 301 to cause the operation unit 106 to display a screen for receiving setting values necessary for login, and receives, from the display/operation control unit 301, setting values input using the operation unit 106 and necessary for login. Furthermore, the initial-setting-screen control unit 307 sends the setting values to the setting-value control unit 306, and the setting-value control unit 306 commands the first storage control portion 304 or the second storage control portion 305 to write the setting values. Setting values other than the setting values necessary for login, for example, setting values for functions and setting values for system settings, are sent from a function controller or a setting-screen control unit 309 to the setting-value control unit 306. The setting-value control unit 306 commands the first storage control portion 304 or the second storage control portion 305 to write the setting values.

A copy control unit 308 is an example of a function controller. Other than the copy control unit 308, there may also be, as function controllers, a scan control unit that controls reading of images, a sending control unit that control sending of images, a FAX control unit that controls sending to be performed by fax, and the like. The copy control unit 308 controls the copy function. In the case where a user has selected the copy function, the copy control unit 308 receives the user identifier of the user from the authentication control unit 302 and sends a name indicating the copy function, the user identifier, and an acquisition request for setting values necessary for the copy function to the setting-value control unit 306. The setting-value control unit 306 commands the first storage control portion 304 or the second storage control portion 305 to read the setting values for the copy function associated with the user identifier.

In the first to third embodiments, the CPU 101 plays the roles of the display/operation control unit 301, the authentication control unit 302, the first storage control portion 304, the second storage control portion 305, the setting-value control unit 306, the initial-setting-screen control unit 307, the copy control unit 308, and the setting-screen control unit 309. However, a plurality of CPUs may play respective roles of the control units 301 to 309. In addition, a control circuit other than the CPU 101 may also play one or some of the roles of the control units 301 to 309.

Other Embodiments

In the first to third embodiments, setting values are prepared on a user by user basis; however, setting values may also be prepared on a group by group basis, a plurality of users belonging to each group. In this case, setting values associated with a user who uses the information processing apparatus and setting values associated with a group to which the user belongs are read from the HDD 104 and written into the RAM 102.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An information processing apparatus configured to operate in accordance with setting information, the information processing apparatus comprising:
    an acquisition unit configured to acquire identification information of a user;
    a display control unit configured to display a first screen according to authentication of a user based on the identification information acquired by the acquisition unit;
    a first storage device configured to store, in association with respective users, at least one setting value of a first setting item and at least one setting value of a second setting item different from the first setting item;
    a second storage device, of which a reading speed is faster than a reading speed of the first storage device; and
    a storage control unit configured to store, in the second storage device, the at least one setting value of the first setting item corresponding to a first user and the at least one setting value of the first setting item corresponding to a second user out of setting values stored in the first storage device before the authentication of the user based on the acquired identification information, wherein the storage control unit does not store the at least one setting value of the second setting item in the second storage device before the authentication of the user based on the acquired identification information;
    wherein the display control unit is configured to
    display, according to the authentication of the user, the first screen generated by using the at least one setting value of the first setting item stored in the second storage device in association with an authenticated user,
    display, after displaying the first screen generated by using the at least one setting value of the first setting item, a second screen generated by using the at least one setting value of the second setting item stored in association with the authenticated user, and
    wherein at least one of the acquisition unit, the display control unit and the storage control unit is implemented by at least one processor.

2. The information processing apparatus according to claim 1, wherein the storage control unit stores, in the second storage device, the at least one setting value of the second setting item acquired from the first storage device.

3. The information processing apparatus according to claim 2, wherein the at least one setting value of the second setting item is a setting value to be used for a function provided by the information processing apparatus, and
    the storage control unit acquires, in a case where the authenticated user uses the function, the at least one setting value of the second setting item corresponding to the authenticated user from the second storage device.

4. The information processing apparatus according to claim 3, further comprising:
    a first setting unit configured to set priorities for a plurality of functions provided by the information processing apparatus, wherein
    the first setting unit is implemented by the at least one processor,
    the at least one second setting item is a setting item to be used for each of the plurality of functions provided by the information processing apparatus, and
    the storage control unit acquires the at least one of setting value of the second setting item corresponding to each of the plurality of functions from the first storage device and stores the at least one of setting value of the second setting item in the second storage device.

5. The information processing apparatus according to claim 1, wherein the at least one setting value of the second setting item corresponding to the authenticated user is stored in the second storage device until a next user, who is a third user, is authenticated based on the acquired user identification information,
    the information processing apparatus further comprising:
    a determination unit configured to determine, in a case where the third user has been authenticated, whether or not the third user is the same as a user who has been authenticated last time, who is a fourth user, wherein
    the storage control unit does not acquire, in a case where the third user is the same as the fourth user, the at least one setting value of the second setting items corresponding to the third user from the first storage device.

6. The information processing apparatus according to claim 1, wherein the first storage device is a hard disk and the second storage device is a RAM.

7. The information processing apparatus according to claim 1,
    wherein the storage control unit stores, in the second storage device, the at least one setting value of the second setting item stored in the first storage device in association with the authenticated user, and wherein the display control unit displays the second screen generated by using the at least one setting value of the second setting item stored in the second storage device in association with the authenticated user.

8. The information processing apparatus according to claim 1, wherein the first setting item is language information used for displaying a screen.

9. The information processing apparatus according to claim 1, wherein the first setting item is initial screen information indicating a screen to be first displayed after the authentication of the user.

10. The information processing apparatus according to claim 1, further comprising:
a scanner that scans an image on a document to generate image data.

11. The information processing apparatus according to claim 10, wherein the second setting item is setting information used for scanning by the scanner.

12. The information processing apparatus according to claim 1, further comprising:
a printer that prints an image on a sheet based on image data.

13. The information processing apparatus according to claim 12, wherein the second setting item is setting information used for printing by the printer.

14. A control method for an information processing apparatus including a first storage device configured to store, in association with respective users, at least one setting value of a first setting item and at least one setting value of second setting item different from the first setting item and a second storage device, of which a reading speed is faster than a reading speed of the first storage device, the control method comprising:
acquiring identification information of a user;
storing, in the second storage device, the at least one setting value of the first setting item corresponding to a first user and the at least one setting value of the first setting item corresponding to a second user out of setting values stored in the first storage device before authentication of a user based on the acquired identification information, wherein the at least one setting value of the second setting item is not stored in the second storage device before the authentication of the user based on the acquired identification information;
displaying, according to the authentication of the user, a screen generated by using the at least one setting value of the first setting item stored in the second storage device in association with an authenticated user; and
displaying, after displaying the screen generated by using the at least one setting value of the first setting item, a screen generated by using the at least one setting value of the second setting item stored in association with the authenticated user.

15. A non-transitory computer-readable storage medium having stored thereon program code for controlling an information processing apparatus including a first storage device configured to store, in association with respective users, at least one setting value of a first setting item and at least one setting value of second setting item different from the first setting item and a second storage device, of which a reading speed is faster than a reading speed of the first storage device, the program code comprising:

a code to acquire identification information of a user;
a code to store, in the second storage device, the at least one setting value of the first setting item corresponding to a first user and the at least one setting value of the first setting item corresponding to a second user out of setting values stored in the first storage device before authentication of a user based on the acquired identification information, wherein the at least one setting value of the second setting item is not stored in the second storage device before the authentication of the user based on the acquired identification information;
a code to display, according to the authentication of the user, a screen generated by using the at least one setting value of the first setting item stored in the second storage device in association with an authenticated user; and
a code to display, after displaying the screen generated by using the at least one setting value of the first setting item, a screen generated by using the at least one setting value of the second setting item stored in association with the authenticated user.

16. An information processing apparatus to which plurality of users are able to log in comprising:
a storage control unit configured to write information stored in a nonvolatile memory or a part of the information from the nonvolatile memory into a volatile memory; and
a display unit configured to display a screen based on the information stored in the volatile memory;
wherein the storage control unit writes, from the nonvolatile memory into the volatile memory, first information that related to a plurality of users and is necessary for displaying a first screen that is to be displayed immediately after login,
wherein, after a login instruction is received, the display unit displays the first screen based on the first information written into the volatile memory,
wherein, after login processing is finished, the storage control unit writes, from the nonvolatile memory into the volatile memory, second information or a part of the second information that is included in the information and is not the first information, and
wherein the display unit displays the second screen using the second information or the part of the second information stored in the volatile memory.

17. The information processing apparatus according to claim 16,
wherein the second information that is used for displaying the second screen and is read out from the nonvolatile memory to the volatile memory after the login processing is finished is information related to a login user who is currently logged in.

18. The information processing apparatus according to claim 16,
wherein the first information includes a setting value for a display language of the first screen and a setting value for an initial screen that is to be displayed as the first screen.

19. The information processing apparatus according to claim 16,
wherein the second screen is a screen that is displayed by selecting an icon on the first screen and relates to a function of the information processing apparatus corresponding to the icon.

* * * * *